(12) United States Patent
Khuti et al.

(10) Patent No.: US 7,761,923 B2
(45) Date of Patent: *Jul. 20, 2010

(54) PROCESS CONTROL METHODS AND APPARATUS FOR INTRUSION DETECTION, PROTECTION AND NETWORK HARDENING

(75) Inventors: Bharat Khuti, Raleigh, NC (US); Clayton Coleman, Attleboro, MA (US); David Rath, Latrobe, PA (US); Ernest Rakaczky, Pincourt (CA); Jim Leslie, Calgary (CA); Juan Peralta, Lambert (CA); George Simpson, Simpsonville, SC (US)

(73) Assignee: Invensys Systems, Inc., Foxboro, MA (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/069,465

(22) Filed: Mar. 1, 2005
(Under 37 CFR 1.47)

(65) Prior Publication Data
US 2006/0294579 A1  Dec. 28, 2006

Related U.S. Application Data

(60) Provisional application No. 60/549,342, filed on Mar. 1, 2004, provisional application No. 60/588,622, filed on Jul. 16, 2004.

(51) Int. Cl.
*G06F 9/00* (2006.01)
*G06F 11/00* (2006.01)
*G06F 7/04* (2006.01)

(52) U.S. Cl. .............................. 726/27; 726/11; 726/23

(58) Field of Classification Search .................. 713/193; 726/11, 23, 27
See application file for complete search history.

(56) References Cited

U.S. PATENT DOCUMENTS 3,096,434 A    7/1963   King
(Continued)

FOREIGN PATENT DOCUMENTS

EP    0411869    2/1991
(Continued)

OTHER PUBLICATIONS

"A sensation in supervisory control," Manufacturing Systems (Windows NT in manufacturing Supplement), Oct. 1996, pp. 12A-24A.
(Continued)

*Primary Examiner*—Nasser Moazzami
*Assistant Examiner*—Mohammad W Reza
(74) *Attorney, Agent, or Firm*—Nutter McClennen & Fish LLP; David J. Powsner; Joshua T. Matt

(57) ABSTRACT

The invention provides an improved network and methods of operation thereof for use in or with process control systems, computer-based manufacturing or production control systems, environmental control systems, industrial control system, and the like (collectively, "control systems"). Those networks utilize a unique combination of firewalls, intrusion detection systems, intrusion protection devices and/or other devices for hardening (e.g., security against hacking, intrusion or other mischievous conduct) and/or intrusion detection. The networks and methods have application, by way of example, in plants, sites and other facilities in which networks that support control systems interface with corporate, business or other networks.

31 Claims, 6 Drawing Sheets

U.S. PATENT DOCUMENTS

| | | |
|---|---|---|
| 3,404,264 A | 10/1968 | Kugler |
| 3,665,172 A | 5/1972 | Spaargaren et al. |
| 3,701,280 A | 10/1972 | Stroman |
| 3,802,590 A | 4/1974 | Culver |
| 3,810,119 A | 5/1974 | Zieve et al. |
| 3,825,905 A | 7/1974 | Allen, Jr. |
| 3,959,772 A | 5/1976 | Wakasa et al. |
| 4,006,464 A | 2/1977 | Landell |
| RE29,383 E | 9/1977 | Gallatin et al. |
| 4,058,975 A | 11/1977 | Gilbert et al. |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,351,023 A | 9/1982 | Richer |
| 4,377,000 A | 3/1983 | Staab |
| 4,410,942 A | 10/1983 | Milligan et al. |
| 4,413,314 A | 11/1983 | Slater et al. |
| 4,423,486 A | 12/1983 | Berner |
| 4,428,044 A | 1/1984 | Liron |
| 4,435,762 A | 3/1984 | Milligan et al. |
| 4,443,861 A | 4/1984 | Slater |
| 4,456,997 A | 6/1984 | Spitza et al. |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,530,234 A | 7/1985 | Cullick et al. |
| 4,609,995 A | 9/1986 | Hasebe |
| 4,615,001 A | 9/1986 | Hudgins, Jr. |
| 4,628,437 A | 12/1986 | Poschmann et al. |
| 4,633,217 A | 12/1986 | Akano et al. |
| 4,639,852 A | 1/1987 | Motomiya et al. |
| 4,641,269 A | 2/1987 | Japenga et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,158 A | 7/1987 | Ito et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,704,676 A | 11/1987 | Flanagan et al. |
| 4,709,325 A | 11/1987 | Yajima et al. |
| 4,719,593 A | 1/1988 | Threewitt et al. |
| 4,727,477 A | 2/1988 | Gavril |
| 4,733,366 A | 3/1988 | Deyesso et al. |
| 4,740,955 A | 4/1988 | Litterer et al. |
| 4,742,349 A | 5/1988 | Miesterfeld et al. |
| 4,750,109 A | 6/1988 | Kita et al. |
| 4,790,762 A | 12/1988 | Harms et al. |
| 4,805,107 A | 2/1989 | Kieckhafer et al. |
| 4,806,905 A | 2/1989 | McGowan, III et al. |
| 4,816,996 A | 3/1989 | Hill et al. |
| 4,817,094 A | 3/1989 | Lebizay et al. |
| 4,872,106 A | 10/1989 | Slater |
| 4,896,290 A | 1/1990 | Rhodes et al. |
| 4,897,777 A | 1/1990 | Janke et al. |
| RE33,162 E | 2/1990 | Yoshida et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,926,158 A | 5/1990 | Zeigler |
| 4,934,196 A | 6/1990 | Romano |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean et al. |
| 4,991,076 A | 2/1991 | Zifferer et al. |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,089,927 A | 2/1992 | Bulan et al. |
| 5,089,974 A | 2/1992 | Demeyer et al. |
| 5,109,692 A | 5/1992 | Fitzgerald |
| 5,121,318 A | 6/1992 | Lipner et al. |
| 5,122,948 A | 6/1992 | Zapolin |
| 5,124,908 A | 6/1992 | Broadbent |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,140,677 A | 8/1992 | Fleming et al. |
| 5,146,589 A | 9/1992 | Peet, Jr. et al. |
| 5,150,289 A | 9/1992 | Badavas |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,164,894 A | 11/1992 | Cunningham-Reid et al. |
| 5,166,685 A | 11/1992 | Campbell, Jr. et al. |
| 5,168,276 A | 12/1992 | Huston et al. |
| 5,168,441 A | 12/1992 | Onarheim et al. |
| 5,175,698 A | 12/1992 | Barbanell |
| 5,175,829 A | 12/1992 | Stumpf et al. |
| 5,181,978 A | 1/1993 | Ochiai et al. |
| 5,193,175 A | 3/1993 | Cutts, Jr. et al. |
| 5,202,961 A | 4/1993 | Mills et al. |
| 5,212,784 A | 5/1993 | Sparks |
| 5,233,615 A | 8/1993 | Goetz |
| 5,245,704 A | 9/1993 | Weber et al. |
| 5,251,125 A | 10/1993 | Karnowski et al. |
| 5,255,367 A | 10/1993 | Bruckert et al. |
| 5,258,999 A | 11/1993 | Wernimont et al. |
| 5,271,013 A | 12/1993 | Gleeson |
| 5,276,901 A | 1/1994 | Howell et al. |
| 5,283,729 A | 2/1994 | Lloyd |
| 5,289,365 A | 2/1994 | Caldwell et al. |
| 5,291,390 A | 3/1994 | Satou et al. |
| 5,295,258 A | 3/1994 | Jewett et al. |
| 5,295,263 A | 3/1994 | Kojima et al. |
| 5,297,143 A | 3/1994 | Fridrich et al. |
| 5,301,346 A | 4/1994 | Notarianni et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,346 A | 4/1994 | Fieldhouse et al. |
| 5,307,372 A | 4/1994 | Sawyer et al. |
| 5,307,463 A | 4/1994 | Hyatt et al. |
| 5,309,556 A | 5/1994 | Sismilich |
| 5,310,998 A | 5/1994 | Okuno et al. |
| 5,317,726 A | 5/1994 | Horst |
| 5,325,339 A | 6/1994 | Yost et al. |
| 5,327,144 A | 7/1994 | Stilp et al. |
| 5,335,186 A | 8/1994 | Tarrant |
| 5,335,221 A | 8/1994 | Snowbarger et al. |
| 5,339,362 A | 8/1994 | Harris |
| 5,339,680 A | 8/1994 | Bronkal et al. |
| 5,347,181 A | 9/1994 | Ashby et al. |
| 5,349,343 A | 9/1994 | Oliver |
| 5,352,033 A | 10/1994 | Gresham et al. |
| 5,359,721 A | 10/1994 | Kempf et al. |
| 5,367,640 A | 11/1994 | Hamilton et al. |

| | | | | | |
|---|---|---|---|---|---|
| 5,371,895 A | 12/1994 | Bristol | 5,530,868 A | 6/1996 | Record et al. |
| 5,377,315 A | 12/1994 | Leggett et al. | 5,531,328 A | 7/1996 | Rochelo et al. |
| 5,381,529 A | 1/1995 | Matsushima et al. | 5,534,912 A | 7/1996 | Kostreski |
| 5,384,910 A | 1/1995 | Torres | 5,537,548 A | 7/1996 | Fin et al. |
| 5,386,373 A | 1/1995 | Keeler et al. | 5,539,638 A | 7/1996 | Keeler et al. |
| 5,386,417 A | 1/1995 | Daugherty et al. | 5,539,909 A | 7/1996 | Tanaka et al. |
| 5,390,321 A | 2/1995 | Proesel | 5,541,810 A | 7/1996 | Donhauser et al. |
| 5,392,280 A | 2/1995 | Zheng | 5,544,008 A | 8/1996 | Dimmick et al. |
| 5,392,389 A | 2/1995 | Fleming | 5,544,321 A | 8/1996 | Theimer et al. |
| 5,394,522 A | 2/1995 | Sanchez-Frank et al. | 5,548,528 A | 8/1996 | Keeler et al. |
| 5,398,331 A | 3/1995 | Huang et al. | 5,549,137 A | 8/1996 | Lenz et al. |
| 5,400,140 A | 3/1995 | Johnston et al. | 5,550,980 A | 8/1996 | Pascucci et al. |
| 5,405,779 A | 4/1995 | McCabe et al. | 5,551,047 A | 8/1996 | Mori et al. |
| 5,408,603 A | 4/1995 | Van de Lavoir et al. | 5,555,213 A | 9/1996 | DeLong |
| 5,410,492 A | 4/1995 | Gross et al. | 5,555,437 A | 9/1996 | Packer |
| 5,410,717 A | 4/1995 | Floro | 5,555,510 A | 9/1996 | Verseput et al. |
| 5,420,977 A | 5/1995 | Sztipanovits et al. | 5,559,691 A | 9/1996 | Monta et al. |
| 5,421,017 A | 5/1995 | Scholz et al. | 5,559,963 A | 9/1996 | Gregg et al. |
| 5,426,732 A | 6/1995 | Boies et al. | 5,561,770 A | 10/1996 | de Bruijn et al. |
| 5,428,734 A | 6/1995 | Haynes et al. | 5,563,400 A | 10/1996 | Le Roux et al. |
| 5,428,769 A | 6/1995 | Glaser et al. | 5,564,055 A | 10/1996 | Asnaashari et al. |
| 5,428,781 A | 6/1995 | Duault et al. | 5,566,320 A | 10/1996 | Hubert et al. |
| 5,432,711 A | 7/1995 | Jackson et al. | 5,568,378 A | 10/1996 | Wojsznis |
| 5,434,952 A | 7/1995 | Yen et al. | 5,570,300 A | 10/1996 | Henry et al. |
| 5,434,997 A | 7/1995 | Landry et al. | 5,572,643 A | 11/1996 | Judson |
| 5,437,007 A | 7/1995 | Bailey et al. | 5,572,673 A | 11/1996 | Shurts |
| 5,440,237 A | 8/1995 | Brown et al. | 5,576,946 A | 11/1996 | Bender et al. |
| 5,442,639 A | 8/1995 | Crowder et al. | 5,579,220 A | 11/1996 | Barthel et al. |
| 5,442,791 A | 8/1995 | Wrabetz et al. | 5,579,487 A | 11/1996 | Meyerson et al. |
| 5,444,851 A | 8/1995 | Woest | 5,581,760 A | 12/1996 | Atkinson et al. |
| 5,444,861 A | 8/1995 | Adamec et al. | 5,586,066 A | 12/1996 | White et al. |
| 5,450,403 A | 9/1995 | Ichii et al. | 5,586,112 A | 12/1996 | Tabata et al. |
| 5,450,425 A | 9/1995 | Gunn et al. | 5,586,156 A | 12/1996 | Gaubatz |
| 5,450,764 A | 9/1995 | Johnston et al. | 5,586,329 A | 12/1996 | Knudsen et al. |
| 5,451,923 A | 9/1995 | Seberger et al. | 5,586,330 A | 12/1996 | Knudsen et al. |
| 5,451,939 A | 9/1995 | Price et al. | 5,587,899 A | 12/1996 | Ho et al. |
| 5,452,201 A | 9/1995 | Pieronek et al. | 5,594,858 A | 1/1997 | Blevins |
| 5,457,797 A | 10/1995 | Butterworth et al. | 5,594,899 A | 1/1997 | Knudsen et al. |
| 5,459,825 A | 10/1995 | Anderson et al. | 5,596,331 A | 1/1997 | Bonaffini et al. |
| 5,459,839 A | 10/1995 | Swarts et al. | 5,596,752 A | 1/1997 | Knudsen et al. |
| 5,461,710 A | 10/1995 | Bloomfield et al. | 5,598,536 A | 1/1997 | Slaughter, III et al. |
| 5,463,735 A | 10/1995 | Pascucci et al. | 5,598,566 A | 1/1997 | Pascucci et al. |
| 5,467,264 A | 11/1995 | Rauch et al. | 5,600,845 A | 2/1997 | Gilson |
| 5,469,150 A | 11/1995 | Sitte | 5,604,737 A | 2/1997 | Iwami et al. |
| 5,469,570 A | 11/1995 | Shibata et al. | 5,604,871 A | 2/1997 | Pecone |
| 5,475,856 A | 12/1995 | Kogge | 5,608,607 A | 3/1997 | Dittmer |
| 5,481,715 A | 1/1996 | Hamilton et al. | 5,608,608 A | 3/1997 | Flint et al. |
| 5,481,741 A | 1/1996 | McKaskle et al. | 5,611,057 A | 3/1997 | Pecone et al. |
| 5,483,660 A | 1/1996 | Yishay et al. | 5,613,148 A | 3/1997 | Bezviner et al. |
| 5,485,617 A | 1/1996 | Stutz et al. | 5,613,164 A | 3/1997 | DiAngelo et al. |
| 5,485,620 A | 1/1996 | Sadre et al. | 5,613,190 A | 3/1997 | Hylton |
| 5,490,276 A | 2/1996 | Doli, Jr. et al. | 5,617,540 A | 4/1997 | Civanlar et al. |
| 5,491,625 A | 2/1996 | Pressnall et al. | 5,621,871 A | 4/1997 | Jaremko et al. |
| 5,491,791 A | 2/1996 | Glowny et al. | 5,621,890 A | 4/1997 | Notarianni et al. |
| 5,493,534 A | 2/1996 | Mok | 5,623,592 A | 4/1997 | Carlson et al. |
| 5,499,023 A | 3/1996 | Goldschmidt | 5,623,670 A | 4/1997 | Bohannon et al. |
| 5,499,365 A | 3/1996 | Anderson et al. | 5,627,979 A | 5/1997 | Chang et al. |
| 5,500,934 A | 3/1996 | Austin et al. | 5,629,872 A | 5/1997 | Gross et al. |
| 5,501,608 A | 3/1996 | Scheer et al. | 5,629,949 A | 5/1997 | Zook |
| 5,504,672 A | 4/1996 | Hardiman et al. | 5,630,056 A | 5/1997 | Horvath et al. |
| 5,504,895 A | 4/1996 | Kurosawa et al. | 5,630,152 A | 5/1997 | DeLuca et al. |
| 5,504,902 A | 4/1996 | McGrath et al. | 5,642,259 A | 6/1997 | Ma et al. |
| 5,509,811 A | 4/1996 | Homic | 5,642,511 A | 6/1997 | Chow et al. |
| 5,513,095 A | 4/1996 | Pajonk et al. | 5,648,768 A | 7/1997 | Bouve |
| 5,513,192 A | 4/1996 | Janku et al. | 5,649,121 A | 7/1997 | Budman et al. |
| 5,513,354 A | 4/1996 | Dwork et al. | 5,655,092 A | 8/1997 | Ojala et al. |
| 5,517,655 A | 5/1996 | Collins et al. | 5,659,680 A | 8/1997 | Cunningham et al. |
| 5,519,605 A | 5/1996 | Cawlfield | 5,664,101 A | 9/1997 | Picache |
| 5,519,701 A | 5/1996 | Colmant et al. | 5,664,168 A | 9/1997 | Yishay et al. |
| 5,522,044 A | 5/1996 | Pascucci et al. | 5,671,374 A | 9/1997 | Postman et al. |
| 5,526,353 A | 6/1996 | Henley et al. | 5,676,141 A | 10/1997 | Hollub |
| 5,530,377 A | 6/1996 | Walls | 5,680,404 A | 10/1997 | Gray et al. |
| 5,530,643 A | 6/1996 | Hodorowski | 5,680,409 A | 10/1997 | Qin et al. |

| | | | | | |
|---|---|---|---|---|---|
| 5,682,317 A | 10/1997 | Keeler et al. | 5,841,963 A | 11/1998 | Nakamikawa et al. |
| 5,682,476 A | 10/1997 | Tapperson et al. | 5,841,991 A | 11/1998 | Russell |
| 5,687,316 A | 11/1997 | Graziano et al. | 5,844,601 A | 12/1998 | McPheely et al. |
| 5,700,090 A | 12/1997 | Eryurek | 5,844,796 A | 12/1998 | Araki et al. |
| 5,701,414 A | 12/1997 | Cheng et al. | 5,844,804 A | 12/1998 | Schussler et al. |
| 5,701,484 A | 12/1997 | Artsy | 5,847,957 A | 12/1998 | Cohen et al. |
| 5,704,011 A | 12/1997 | Hansen et al. | 5,854,750 A | 12/1998 | Phillips et al. |
| 5,706,502 A | 1/1998 | Foley et al. | 5,854,944 A | 12/1998 | Catherwood et al. |
| 5,708,709 A | 1/1998 | Rose | 5,859,966 A | 1/1999 | Hayman et al. |
| 5,708,779 A | 1/1998 | Graziano et al. | 5,862,052 A | 1/1999 | Nixon et al. |
| 5,713,045 A | 1/1998 | Berdahl | 5,864,773 A | 1/1999 | Barna et al. |
| 5,715,178 A | 2/1998 | Scarola et al. | 5,867,704 A | 2/1999 | Tanaka et al. |
| 5,716,221 A | 2/1998 | Kantner | 5,872,992 A | 2/1999 | Tietjen et al. |
| 5,717,880 A | 2/1998 | Imai et al. | 5,873,089 A | 2/1999 | Regache |
| 5,719,761 A | 2/1998 | Gatti et al. | 5,874,990 A | 2/1999 | Kato et al. |
| 5,726,912 A | 3/1998 | Krall, Jr. et al. | 5,875,430 A | 2/1999 | Koether |
| 5,727,128 A | 3/1998 | Morrison | 5,876,122 A | 3/1999 | Eryurek |
| 5,732,218 A | 3/1998 | Bland et al. | 5,878,415 A | 3/1999 | Olds |
| 5,734,902 A | 3/1998 | Atkins et al. | 5,880,775 A | 3/1999 | Ross |
| 5,737,529 A | 4/1998 | Dolin, Jr. et al. | 5,903,455 A | 5/1999 | Sharpe, Jr. et al. |
| 5,742,596 A | 4/1998 | Baratz et al. | 5,905,963 A | 5/1999 | Lysejko et al. |
| 5,742,762 A | 4/1998 | Scholl et al. | 5,909,368 A | 6/1999 | Nixon et al. |
| 5,746,511 A | 5/1998 | Eryurek et al. | 5,909,586 A | 6/1999 | Anderson |
| 5,748,467 A | 5/1998 | Qin et al. | 5,917,840 A | 6/1999 | Cheney et al. |
| 5,748,912 A | 5/1998 | Lee | 5,918,233 A | 6/1999 | La Chance et al. |
| 5,751,574 A | 5/1998 | Loebig et al. | 5,919,247 A | 7/1999 | Van Hoff et al. |
| 5,752,007 A | 5/1998 | Morrison | 5,920,479 A | 7/1999 | Sojoodi et al. |
| 5,752,008 A | 5/1998 | Bowling | 5,922,050 A | 7/1999 | Madany |
| 5,752,246 A | 5/1998 | Rogers et al. | 5,928,345 A | 7/1999 | Tetzlaff et al. |
| 5,754,772 A | 5/1998 | Leaf | 5,930,768 A | 7/1999 | Hooban |
| 5,758,073 A | 5/1998 | Liang et al. | 5,940,294 A | 8/1999 | Dove |
| 5,758,075 A | 5/1998 | Graziano et al. | 5,940,839 A | 8/1999 | Chen et al. |
| 5,761,033 A | 6/1998 | Wilhelm | 5,946,487 A | 8/1999 | Dangelo |
| 5,761,090 A | 6/1998 | Gross et al. | 5,956,484 A | 9/1999 | Rosenberg et al. |
| 5,761,405 A | 6/1998 | Tadamura et al. | 5,956,487 A | 9/1999 | Venkatraman et al. |
| 5,761,421 A | 6/1998 | van Hoff et al. | 5,959,487 A | 9/1999 | Kawamura |
| 5,761,518 A | 6/1998 | Boehling et al. | 5,960,205 A | 9/1999 | Mao et al. |
| 5,761,906 A | 6/1998 | Edelstein et al. | 5,960,214 A | 9/1999 | Sharpe, Jr. et al. |
| 5,768,119 A | 6/1998 | Havekost et al. | 5,966,304 A | 10/1999 | Cook et al. |
| 5,768,510 A | 6/1998 | Gish | 5,969,967 A | 10/1999 | Aahlad et al. |
| 5,774,378 A | 6/1998 | Yang et al. | 5,974,497 A | 10/1999 | Teshome |
| 5,774,670 A | 6/1998 | Montulli | 5,975,737 A | 11/1999 | Crater et al. |
| 5,777,874 A | 7/1998 | Flood et al. | 5,978,578 A | 11/1999 | Azarya et al. |
| 5,787,247 A | 7/1998 | Norin et al. | 5,978,933 A | 11/1999 | Wyld et al. |
| 5,787,272 A | 7/1998 | Gupta et al. | 5,980,078 A | 11/1999 | Krivoshein et al. |
| 5,790,791 A | 8/1998 | Chong et al. | 5,980,090 A | 11/1999 | Royal, Jr. et al. |
| 5,793,963 A | 8/1998 | Tapperson et al. | 5,982,362 A | 11/1999 | Crater et al. |
| 5,794,071 A | 8/1998 | Watanabe et al. | 5,982,762 A | 11/1999 | Anzai et al. |
| 5,796,602 A | 8/1998 | Wellan et al. | 5,988,852 A | 11/1999 | Nakanishi et al. |
| 5,797,038 A | 8/1998 | Crawford et al. | 5,991,795 A | 11/1999 | Howard et al. |
| 5,801,770 A | 9/1998 | Paff et al. | 5,994,998 A | 11/1999 | Fisher et al. |
| 5,801,942 A | 9/1998 | Nixon et al. | 5,995,916 A | 11/1999 | Nixon et al. |
| 5,802,389 A | 9/1998 | McNutt | 6,002,104 A | 12/1999 | Hsu |
| 5,805,442 A | 9/1998 | Crater et al. | 6,006,171 A | 12/1999 | Vines et al. |
| 5,805,922 A | 9/1998 | Sim et al. | 6,008,985 A | 12/1999 | Lake et al. |
| 5,812,394 A | 9/1998 | Lewis et al. | 6,014,591 A | 1/2000 | Ikeda et al. |
| 5,815,152 A | 9/1998 | Collier et al. | 6,014,612 A | 1/2000 | Larson et al. |
| 5,815,659 A | 9/1998 | Umetsu et al. | 6,018,627 A | 1/2000 | Iyengar et al. |
| 5,822,220 A | 10/1998 | Baines | 6,026,336 A | 2/2000 | Sakurai et al. |
| 5,828,567 A | 10/1998 | Eryurek et al. | 6,026,352 A | 2/2000 | Burns et al. |
| 5,828,851 A | 10/1998 | Nixon et al. | 6,032,208 A | 2/2000 | Nixon et al. |
| 5,828,882 A | 10/1998 | Hinckley | 6,033,257 A | 3/2000 | Lake et al. |
| 5,831,669 A | 11/1998 | Adrain | 6,035,264 A | 3/2000 | Donaldson et al. |
| 5,832,268 A | 11/1998 | Anderson et al. | 6,038,486 A | 3/2000 | Saitoh et al. |
| 5,832,418 A | 11/1998 | Meyer | 6,049,578 A | 4/2000 | Senechal et al. |
| 5,835,704 A | 11/1998 | Li et al. | 6,049,775 A | 4/2000 | Gertner et al. |
| 5,835,724 A | 11/1998 | Smith | 6,052,629 A | 4/2000 | Leatherman et al. |
| 5,838,563 A | 11/1998 | Dove et al. | 6,055,633 A | 4/2000 | Schrier et al. |
| 5,838,910 A | 11/1998 | Domenikos et al. | 6,061,603 A | 5/2000 | Papadopoulos et al. |
| 5,838,920 A | 11/1998 | Rosborough | 6,070,186 A | 5/2000 | Nishio et al. |
| 5,838,969 A | 11/1998 | Jacklin et al. | 6,070,250 A | 5/2000 | Yeager et al. |
| 5,841,360 A | 11/1998 | Binder et al. | 6,076,124 A | 6/2000 | Korowitz et al. |
| 5,841,654 A | 11/1998 | Verissimo et al. | 6,078,320 A | 6/2000 | Dove et al. |

| | | | |
|---|---|---|---|
| 6,078,848 A | 6/2000 | Bernstein et al. | |
| 6,085,120 A | 7/2000 | Schwerdtfeger et al. | |
| 6,094,600 A | 7/2000 | Sharpe, Jr. et al. | |
| 6,095,674 A | 8/2000 | Verissimo et al. | |
| 6,097,761 A | 8/2000 | Buhring et al. | |
| 6,098,116 A | 8/2000 | Nixon et al. | |
| 6,104,875 A | 8/2000 | Gallagher et al. | |
| 6,105,132 A | 8/2000 | Fritch et al. | |
| 6,108,662 A | 8/2000 | Hoskins et al. | |
| 6,115,468 A | 9/2000 | De Nicolo | |
| 6,129,449 A | 10/2000 | McCain et al. | |
| 6,131,067 A | 10/2000 | Girerd et al. | |
| 6,138,174 A | 10/2000 | Keeley | |
| 6,139,177 A | 10/2000 | Venkatraman et al. | |
| 6,140,911 A | 10/2000 | Fisher et al. | |
| 6,151,625 A | 11/2000 | Swales et al. | |
| 6,157,864 A | 12/2000 | Schwenke et al. | |
| 6,167,253 A | 12/2000 | Farris et al. | |
| 6,170,007 B1 | 1/2001 | Venkatraman et al. | |
| 6,173,411 B1 | 1/2001 | Hirst et al. | |
| 6,173,414 B1 | 1/2001 | Zumkehr et al. | |
| 6,175,556 B1 | 1/2001 | Allen, Jr. et al. | |
| 6,176,421 B1 | 1/2001 | Royal, Jr. et al. | |
| 6,183,289 B1 | 2/2001 | Lake et al. | |
| 6,195,591 B1 | 2/2001 | Nixon et al. | |
| 6,195,694 B1 | 2/2001 | Chen et al. | |
| 6,195,774 B1 | 2/2001 | Jacobson | |
| 6,201,996 B1 | 3/2001 | Crater et al. | |
| 6,212,440 B1 | 4/2001 | Suzuki et al. | |
| 6,212,608 B1 | 4/2001 | Bak | |
| 6,216,158 B1 | 4/2001 | Luo et al. | |
| 6,218,930 B1 | 4/2001 | Katzenberg et al. | |
| 6,219,708 B1 | 4/2001 | Martenson | |
| 6,246,748 B1 | 6/2001 | Yano et al. | |
| 6,260,187 B1 | 7/2001 | Cirne | |
| 6,266,724 B1 | 7/2001 | Harari et al. | |
| 6,268,789 B1 | 7/2001 | Diamant et al. | |
| 6,269,473 B1 | 7/2001 | Freed et al. | |
| 6,272,529 B1 | 8/2001 | Lum | |
| 6,272,556 B1 | 8/2001 | Gish | |
| 6,279,113 B1 | 8/2001 | Vaidya | |
| 6,282,454 B1 | 8/2001 | Papadopoulos et al. | |
| 6,295,356 B1 | 9/2001 | De Nicolo | |
| 6,298,445 B1 | 10/2001 | Shostack et al. | |
| 6,311,101 B1 | 10/2001 | Kastner et al. | |
| 6,314,464 B1 | 11/2001 | Murata et al. | |
| 6,321,334 B1 * | 11/2001 | Jerger et al. | 726/1 |
| 6,324,607 B1 | 11/2001 | Korowitz et al. | |
| 6,327,511 B1 | 12/2001 | Naismith et al. | |
| 6,345,382 B1 | 2/2002 | Hughes | |
| 6,348,874 B1 | 2/2002 | Cole et al. | |
| 6,353,860 B1 | 3/2002 | Hare et al. | |
| 6,370,448 B1 | 4/2002 | Eryurek | |
| 6,393,050 B1 | 5/2002 | Liu | |
| 6,405,099 B1 | 6/2002 | Nagai et al. | |
| 6,405,210 B1 | 6/2002 | Doyle et al. | |
| 6,412,070 B1 | 6/2002 | Van Dyke et al. | |
| 6,418,499 B1 | 7/2002 | Korowitz et al. | |
| 6,424,883 B1 | 7/2002 | Hosokawa et al. | |
| 6,430,564 B1 | 8/2002 | Judge et al. | |
| 6,442,442 B1 | 8/2002 | Weinhofer | |
| 6,445,962 B1 | 9/2002 | Blevins et al. | |
| 6,449,715 B1 | 9/2002 | Krivoshein | |
| 6,473,660 B1 | 10/2002 | Thibault | |
| 6,480,903 B1 | 11/2002 | Voutaz et al. | |
| 6,487,214 B1 | 11/2002 | Bachar | |
| 6,496,892 B1 | 12/2002 | Lake et al. | |
| 6,499,048 B1 | 12/2002 | Williams | |
| 6,501,995 B1 | 12/2002 | Kinney et al. | |
| 6,510,352 B1 | 1/2003 | Badavas et al. | |
| 6,571,140 B1 | 5/2003 | Wewalaarachchi et al. | |
| 6,574,515 B1 | 6/2003 | Kirkpatrick et al. | |
| 6,594,692 B1 | 7/2003 | Reisman | |
| 6,612,022 B1 | 9/2003 | Gale et al. | |
| 6,640,308 B1 | 10/2003 | Keyghobad et al. | |
| 6,671,763 B1 | 12/2003 | Korowitz et al. | |
| 6,675,193 B1 | 1/2004 | Slavin et al. | |
| 6,687,761 B1 | 2/2004 | Collins et al. | |
| 6,691,183 B1 | 2/2004 | Ryan, Jr. | |
| 6,718,533 B1 | 4/2004 | Schneider et al. | |
| 6,754,885 B1 | 6/2004 | Dardinski et al. | |
| 6,760,687 B2 | 7/2004 | Apel et al. | |
| 6,779,128 B1 | 8/2004 | Gale et al. | |
| 6,788,980 B1 | 9/2004 | Johnson | |
| 6,792,321 B2 | 9/2004 | Sepe, Jr. | |
| 6,799,148 B2 | 9/2004 | Ling et al. | |
| 6,799,195 B1 | 9/2004 | Thibault et al. | |
| 6,806,847 B2 | 10/2004 | Nixon et al. | |
| 6,850,973 B1 | 2/2005 | Larson et al. | |
| 6,853,867 B1 | 2/2005 | Klindt et al. | |
| 7,020,532 B2 | 3/2006 | Johnson et al. | |
| 7,032,045 B2 | 4/2006 | Kostadinov | |
| 7,089,530 B1 | 8/2006 | Dardinski et al. | |
| 7,096,465 B1 | 8/2006 | Dardinski et al. | |
| 7,100,165 B2 | 8/2006 | Eldridge et al. | |
| 7,146,231 B2 | 12/2006 | Schleiss et al. | |
| 7,151,966 B1 | 12/2006 | Baier et al. | |
| 7,156,513 B2 | 1/2007 | Ang et al. | |
| 7,158,513 B2 | 1/2007 | Wada et al. | |
| 7,162,510 B2 | 1/2007 | Jammes et al. | |
| 7,177,052 B2 | 2/2007 | Lapstun et al. | |
| 7,199,784 B2 | 4/2007 | Mathiowetz et al. | |
| 7,245,271 B2 | 7/2007 | Nixon et al. | |
| 7,272,815 B1 | 9/2007 | Eldridge et al. | |
| 7,275,062 B2 | 9/2007 | Deitz et al. | |
| 7,289,994 B2 * | 10/2007 | Nixon et al. | 707/10 |
| 7,337,256 B2 | 2/2008 | Korowitz et al. | |
| 7,356,588 B2 | 4/2008 | Stineman, Jr. et al. | |
| 7,372,914 B2 | 5/2008 | Calvin | |
| 2001/0007133 A1 | 7/2001 | Moriconi et al. | |
| 2001/0025307 A1 | 9/2001 | Venkatraman et al. | |
| 2001/0034777 A1 | 10/2001 | Venkatraman et al. | |
| 2001/0034778 A1 | 10/2001 | Venkatraman et al. | |
| 2001/0034779 A1 | 10/2001 | Venkatraman et al. | |
| 2001/0034780 A1 | 10/2001 | Venkatraman et al. | |
| 2001/0034781 A1 | 10/2001 | Venkatraman et al. | |
| 2001/0037489 A1 | 11/2001 | Stripf et al. | |
| 2001/0044836 A1 | 11/2001 | Venkatraman et al. | |
| 2002/0046254 A1 | 4/2002 | Khan et al. | |
| 2002/0052928 A1 | 5/2002 | Stern et al. | |
| 2002/0067370 A1 | 6/2002 | Forney et al. | |
| 2002/0133636 A1 | 9/2002 | Venkatraman et al. | |
| 2002/0150156 A1 | 10/2002 | Calvin | |
| 2003/0051068 A1 | 3/2003 | Eldridge et al. | |
| 2003/0167269 A1 | 9/2003 | Gupta | |
| 2003/0177390 A1 * | 9/2003 | Radhakrishnan | 713/201 |
| 2003/0208558 A1 | 11/2003 | Venkatraman et al. | |
| 2004/0103165 A1 | 5/2004 | Nixon et al. | |
| 2004/0199648 A1 * | 10/2004 | Shelest et al. | 709/229 |
| 2004/0230643 A1 | 11/2004 | Thibault et al. | |
| 2006/0053491 A1 | 3/2006 | Khuti et al. | |
| 2006/0129724 A1 | 6/2006 | Kostadinov | |
| 2006/0206860 A1 | 9/2006 | Dardinski et al. | |
| 2006/0212146 A1 | 9/2006 | Johnson et al. | |
| 2006/0294579 A1 | 12/2006 | Khuti et al. | |
| 2007/0019560 A1 | 1/2007 | Brewer et al. | |
| 2007/0055689 A1 | 3/2007 | Rhoads et al. | |
| 2007/0146231 A1 | 6/2007 | Hamahashi et al. | |
| 2007/0233664 A1 | 10/2007 | Hardin et al. | |
| 2008/0040477 A1 | 2/2008 | Johnson et al. | |
| 2008/0046598 A1 | 2/2008 | Johnson et al. | |
| 2008/0052386 A1 | 2/2008 | Johnson et al. | |
| 2008/0052632 A1 | 2/2008 | Thibault et al. | |
| 2008/0119951 A1 | 5/2008 | Thibault et al. | |
| 2008/0120367 A1 | 5/2008 | Thibault et al. | |
| 2008/0126500 A1 | 5/2008 | Thibault et al. | |

| | | | |
|---|---|---|---|
| 2008/0133700 | A1 | 6/2008 | Thibault et al. |
| 2008/0134215 | A1 | 6/2008 | Thibault et al. |
| 2008/0148170 | A1 | 6/2008 | Thibault et al. |
| 2008/0151973 | A1 | 6/2008 | Calvin |
| 2008/0222276 | A1 | 9/2008 | Thibault et al. |

FOREIGN PATENT DOCUMENTS

| | | |
|---|---|---|
| EP | 0592921 | 4/1994 |
| EP | 0640905 | 3/1995 |
| EP | 0660231 | 6/1995 |
| JP | 11143511 | 5/1999 |
| WO | WO-9114324 | 9/1991 |
| WO | WO-9623377 | 8/1996 |
| WO | WO-9631047 | 10/1996 |
| WO | WO-9707486 | 2/1997 |
| WO | WO-9726587 | 7/1997 |
| WO | WO-9820649 | 5/1998 |
| WO | WO-9829804 | 7/1998 |
| WO | WO-9836518 | 8/1998 |
| WO | WO-9854843 | 12/1998 |
| WO | WO-9921322 | 4/1999 |
| WO | WO-0004805 | 2/2000 |
| WO | WO-0077592 | 12/2000 |
| WO | WO-0161706 | 8/2001 |
| WO | WO-03039098 | 5/2003 |

OTHER PUBLICATIONS

"Agenda," ISA/SP50—1988-180, ISA Draft. (1 page).
"At Interop, Will ToasterNet Be on the Hot List?" Data Communications, vol. 19, No. 13, Oct. 1990, p. 214.
"Automatic Control Systems," George J. Thayer, et al., pp. 1-60, 1989.
"Automation System Monitors, Controls Fab HVAC, Other Systems," *Microcontamination* (Aug. 1994) (1 page).
"bsy's List of Internet Accessible Coke Machines," web page print-out (Feb. 12, 1999) from http://www-cse.ucsd.edu/users/bsy/coke.html (1 page).
"CMU SCS Coke Machine: Current Status," web page print-out (Feb. 12, 1999) from http://www.cs.cmu.edu/~coke/ (1 page).
"Control System Features Plug-and-Play Technology, Scalability," Chemical Processing (May 1996), p. 33.
"Disk Drive with Embedded Hyper-Text Markup Language Server," IBM TDB, vol. 38, n. 12, Dec. 1995, pp. 479-480.
"Elsag Bailey Automation," (in Italian, no date) (35 pages).
"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995. (2 pages).
"ErgoTech upgrades ErgoCim; First 'plug and play' component software for manufacturing," Business Wire, Feb. 15, 1996. (2 pages).
"Fisher-Rosemount Is: Managing the Process Better," Fisher Controls International, Inc. and Rosemount Inc. 1993. (19 pages).
"I/A Series Model 51 FoxRemote II Installation and Configuration Guide," Apr. 8, 1998 (Preliminary), pp. i-iv, 1-2.
"Industry's top embedded operating software supports Java; pSOSystem enables Embedded Internet applications and Low-cost Internet appliances," Business Wire, Feb. 1, 1996. (3 pages).
"Information technology in manufacturing," Manufacturing Systems, vol. 14, No. 12, Dec. 1996, pp. 54-78.
"Internet windows to the world," New Media Age, Oct. 26, 1995, p. 4.
"Introducing Bailey Evolution 90™ . . . The sound investment strategy for process automation," Bailey infi 90 (brochure) (No Date) (30 Pages).
"Jim Henry's 1996 ASEE Paper," web page print-out from http://chem.engr.utc.edu/Documents/ASEE-96-full.html (5 pages).
"Make Your Automation Plan a Reality: MAX1000," Leeds & Northrup Technical Overview (no date) (38 Pages).
"NCR Fieldbus Slave Controller Advance Information," ISA-SP50-1988-161, ISA Draft. (4 pages).
"New Open Architecture Group Works on Control Standards," Control Engineering Online (Aug. 1997).
"New State-Logic Microcontroller," News Release, Control Technology Corp., Jun. 1, 1996, (DialogWeb search result) (1 page).
"On-Line Vending Machine and Catalog Product Icons," IBM TDB vol. 38 No. 4 (Apr. 1995), pp. 113-116.
"Peter Beebee's Home Page," web page print-out (Feb. 12, 1999) from http://www-swiss.ai.mit.edu/htbin/ptbbgate/jwz/?fetch+personal%2Fmain.text.html (2 pages).
"Process Manager Specification and Technical Data," UCO3-300 Sep. 1991 Honeywell © 1990 (43 pages).
"Radio Field Bus," ISA/SP50—1988-184, ISA Draft, pp. 1-18.
"Signal Conditioners Designed for Fisher-Rosemount Systems Delta V," issued by M-System Co., Ltd. (Dec. 1997), (8 pages).
"Suggested Outline for Application Sub-committee Document: Fieldbus Architecture Subcommittee Document," ISA/SP50—1988-175, ISA Draft, pp. 1-7.
"TDC 3000 Overview,"Honeywell (no date) (23 pages).
"TDC 3000 Process Manager™: Process Connected Solutions for the Advanced Controls Requirements of the 1990s," Honeywell (no date) (10 pages).
"The 'Only' Coke Machine on the Internet," web page print-out (Feb. 12, 1999) from http://www.cs.cmu.edu/~coke/history_long.txt (3 pages).
"The Object Primer", Scott Ambler, pp. 1-248. Jan. 4, 1996.
"The Switzerland Coke Machine Credits," web page print-out (Feb. 12, 1999) from http://www-swiss.ai.mit.edu/htbin/coke/ (1 page).
"Tour an actual TribeLink via WebManage," web page print-out from http://www.tribe.com/products/webmanage/quick_view.htm. (1 page).
"Tribe Announces Revolutionary Use of the Internet; Launches Innovative Remote Management Solution; New WebManage Technology Provides Network Management via World Wide Web," Business Wire, May 22, 1995. (2 pages).
"Tribe Computer Works' Net Products Can be Managed via World Wide Web," IAC (SM) Newsletter Database™, DataTrends Publications, Inc., No. 11, vol. 7, May 30, 1995. (2 pages).
"Tribe Launches First Networking Device Capable of Being Managed via Internet Web Browser; TribeLink2 Enables Remote Computing and Internet Access," Business Wire, May 22, 1995, (2 pages).
"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).
"TribeRoute," web page print-out (Jul. 12, 1999) from http://www.tribe.com/products/tr/index. (3 pages).
Caro, Richard H. "The Fifth Generation Process Control Architecture," ISA (1988) Paper #88-1487, pp. 659-667.
Caro, Richard H. "Field Bus Applications," ISA (1989) Paper #89-0569, pp. 989-994.
Chettle, Tim. "Multiplexing techniques optimise data collection," *Electrotechnology* (Oct./Nov. 1995). (2 pages).
Coleman, Vernon. "National Electrical Manufacturers Association Field Bus Report to ISA SP50," (Oct. 1988) ISA/SP50-1988-234 (14 pages).
Conference Record of the 1993 IEEE Industry Applications Conference, Part III (excerpt). (pp. 24-31).
Contents, Proceedings of the Second International Workshop on Configurable Distributed Systems, Mar. 21-23, 1994, Pittsburgh, PA. (pp. 5-7).
Control Shell Version 6.0 User's Manual, 426 pgs., Jan. 1999.
ControlShell version 5.1, User's Manual, Real-Time Innovations, Jun. 1996, Whole manual.
Cox, Mark J. and Baruch, Dr. John E. F. "Robotic Telescopes: An Interactive Exhibit on the World-Wide Web," web page print-out from http://www.ncsa.uiuc.edu/SDG/IT94/Proceedings/Museum/cox/markcox.html (11 pages).
Craig, Lynn W. "SP-88 Defines Batch Control," *INTECH* Mar. 1994, pp. 34-37.
Crowder, R. S. "A Communication Architecture for Automation & Control," ISA, pp. 669-673.
Crowder, R. S. "Generic Data Link Transactions for Simple Devices," Proposal to ISA SP 50 & IEC/SC65C/WG6 (Oct. 15, 1988) ISA Document. (15 pages).

Delfino, B. and Pinceti, P. "Fieldbus Applications for Electrical Industrial Systems," IEEE (1993), pp. 2084-2090.

Demetratekes, Pam. "Go with the info flow; state-of-the-art automation in the food industry; includes related article on computer software for food processors," Food Processing, vol. 57, No. 7, Jul. 1996, p. 47.

Dryden, Patrick, "Tribes WebManage Enables Remote Fixes," ComputerWorld, May 22, 1995, p. 14.

Duffey, C.K., et al. "High-Level Control Language Customizes Application Programs," IEEE Computer Applications in Power (1991), pp. 15-18.

Editing Committee Draft Application Layer, Version 12, Oct. 1991. (282 pages).

Editing Committee Draft Application Layer, Version 6, Dec. 1990, (260 pages).

Editing Committee Draft Application Layer, Version 8, May 1991. (344 pages).

Elmer-Dewitt, Philip, "Snowballs in Cyberspace; With a modem and a soldering iron, you too can build an Internet site that is really cool and totally useless," Time, Jan. 16, 1995, p. 57.

Esprit Project 6188, "PRIAM Dictionary: Major Terms and Definitions Used in the PRIAM Project," Prenormative Requirements for Intelligent Actuation and Measurement, May 1995, 14 pages.

Esprit Project 8244, "User Requirements for Intelligent Transmitters and Actuators," European Intelligent Actuation and Measurement User Group, Nov. 24, 1995, (4 pages).

Fieldbus Standard for Use in Industrial Control Systems. Part 2: Physical Layer Specification and Service Definition. (1992) ANSI/ISA-S50.02., pp. 1-103.

Foster, Kirsten. "surf's up; lights, camera, but no action; Steve is a Tech-Nomad. He wanders the streets with a camera on his head. And he wants you to join him," The Independent (London), Aug. 13, 1995, p. 10.

Foxboro Fieldbus Proposal (Presented to ISA SP-50 Committee Feb. 24, 1988) ISA/SP50-1988-123B, ISA Draft, pp. i-xxii, 1-200.

Foxboro, "I/A Series Software FoxDraw", 8 pgs., 1996.

Foxboro, "Intelligent Automation Series Human Interface Software", 20 pgs., 1997.

Fulcher, Jim and Dilger, Karen Abramic, "Soft control, Internet spark ISA/96," Manufacturing Systems, vol. 14, No. 12, Dec. 1996, pp. 40-46.

Furness, Harry. "Fieldbus: The Differences Start From the Bottom Up," Control Engineering (Mar. 1994), pp. 75-77.

Gertz, Matthew, et al. "A Human-Machine Interface for Distributed Virtual Laboratories," IEEE Robotics & Automation Magazine Dec. 1, 1994, No. 4 (New York) pp. 5-13.

Gleick, James. "Fast Forward; Really Remote Control," The New York Times, Section 6, col. 3, p. 42, Dec. 3, 1995.

Goldberg, Ken, et al. "Beyond the Web: Excavating the Real World Via Mosaic," (Conference Paper) The Mercury Project (Oct. 17-21, 1994).

Goldberg, Ken, et al. "Desktop Teleoperation via the World Wide Web," IEEE International Conference on Robotics and Automation, pp. 654-659, (1995).

Goldstein, Ira and Hardin, Joseph, "Guest editorial," Computer Networks and ISDN Systems 28 (1995) p. 1.

Gyorki, John R. "PLCs drive standard buses," Machine Design (May 11, 1995), pp. 83-90.

H.J. Beestermoller et al., "An Online and offline programmable Multiple-Loop Controller for Distributed Systems", IEEE (1994), pp. 15-20.

Hashemian, et al., "In-Situ Response Time Testing of Thermocouples", ISA 1989, Paper #89-0056, pp. 587-593.

Henry, "A Fault-Tolerant Interface for Self-Validating Sensors", Oxford University, Digest No. 1990/145 (Nov. 1990).

Henry, "A New Approach to Sensor Validation", IMC, Mar. 17, 1992.

Henry, "Intelligent Behaviour for Self-Validating Sensors", University of Oxford, Report No. OUEL 1912/92.

Henry, "Signal Processing, Data Handling and Communications: The Case for Measurement Validation," University of Oxford, Report No. OUEL 1912/92.

Henry, et al., "A Standard Interface for Self-Validating Sensors", University of Oxford, Report No. OUEL 1884/91.

Henry, et al., "The Implication of Digital Communications on Sensor Validation," University of Oxford, Report No. OUEL 1912/92.

Henry, Jim, Ph.D., P.E. "Implementation of Practical Control Systems: Problems and Solutions," web page print-out from http://chem.engr.utc.edu/Documents/MACSCITECH/MACSCITECHpaper1.html (22 pages).

Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem.engr.utc.edu/Documents/ASEE-95-full.html (22 pages), Apr. 10, 2001.

Holding, David and Wood, Graham. "Communications in microprocessor industrial implementation," Microprocessors and Microsystems vol. 3 No. 10 (Dec. 1979), pp. 443-451.

ICCard Design Sep./Oct. 1995.

Invensys, "FoxDraw Display Builder and Configurator", 8 pgs., 2004.

Johnson, Dick. "Pressure Sensing Advances: Are They in Your Process' Future?" Control Engineering (Apr. 1995), pp. 67-72.

Johnsson, et al., "High-Level Grafcet and Batch Control", Nov. 1994, Symposium ADPM.

Kelly, D. Mark. "Digital fieldbus cluster cuts plant's wiring costs up to 20%," INTECH (Apr. 1995), pp. 62-64.

Kline, "The Purposes of Uncertainty Analysis", vol. 107, Journal of Fluids Engineering, pgs. 153-160 (Jun. 1985).

Ko, Diffu, "Tribe defines net management role for Web browser software," Network World, May 22, 1995, p. 14.

Kostas, et al., "Real-Time Voice Over Packet-Switched Networks", pp. 18-27, IEEE Network (Jan./Feb. 1988).

Koth, H. and Oeder, K. "The Advantages of Intelligent Field Modules for Nuclear Power Plant Operation and Maintenance," Kerntechnik 60 (1996) 5-6, pp. 215-219.

Lenhart, Gerald W. "A Field Bus Approach to Local Control Networks," ISA, Paper #93-281, 1993. (4 pages).

Lenhart, Gerald W. "Fieldbus-Based Local Control Networks," INTECH (Aug. 1994), p. 31-34.

Leon, Mark, "Tektronix to add Web software on new printers," InfoWorld, Dec. 4, 1995, p. 6.

Loose, Graham. "Fieldbus—the user's perspective," Measurement + Control vol. 27 (Mar. 1994), pp. 47-51.

Martin, "Design and Strategy for Distributed Data Processing", Chptrs. 19 & 20, pp. 272-305 (1981).

Meeting Minutes, Ad Hoc Function Block Meeting, Jun. 14, 1990, Chapel Hill, NC, pp. 1-60.

Meeting Minutes, Process Control Working Group of SP50.4, Jan. 21-23, 1991, Atlanta, GA. (8 pages).

Meeting Minutes, SP50, International Electrotechnical Commission, Technical Committee No. 65: Industrial-Process Measurement and Control, Sub-Committee 65C: Digital Data Communications for Measurement and Control and Working Group 6: Field Bus Standard f, Feb. 29-Mar. 4, 1988, Arizona, (143 pages).

Meeting Minutes, SP50, Signal Compatibility of Electrical Instruments, Dec. 5-7, 1990, Orlando, FL. (64 pages).

Meeting Minutes, SP50.4 Application Layer, Oct. 19-21, 1988, Houston, TX. (96 pages).

Meeting Minutes, Windows Working Group of Application Subcommittee, Mar. 1-3, 1989, New Orleans, LA, pp. 1-8.

Meeting Notes, International Electrotechnical Commission Sub Committee No. 65C: Digital Communications Working Group 7, Process Control Function Blocks Report to AMT/7. Apr. 4, 1996. (42 pages).

Mirabella, Orazio. "A Short Presentation of IEC Fieldbus Application Layer," Informatics and Communication Institute, Engineering Faculty, University of Catania, Italy. (54 pages) (no date).

Momal, F. and Pinto-Pereira, C. "Using World-Wide-Web for Control Systems," from Proceedings 1995 International Conference on Accelerator and Large Experimental Physics Control Systems, Chicago, IL, Oct. 30-Nov. 3, 1995. (10 pages).

Morel, G., et al. "Discrete Event Automation Engineering: Outline of the PRIAM Project." (12 pages) (no date).

Mori, et al., "The PCMCIA Developer's Guide, Second Edition," Sycard Technology 1994.

NOAH: Network Oriented Application Harmonisation based on General Purpose Field Communication System. Project description rev. 1.0, Oct. 25, 1995. P-NET, PROFIBUS, WorldFIP, pp. 1-22.

Nobuhiko, Tsuji, et al. "An Advanced Optical Fieldbus Instrumentation System Using 16×16 Reflection Type Optical Star Coupler and Low Powered Transmitter," pp. 755-764. (no date).

Notte, Angelo J. "Multitasking Capability Simplifies Process Control Design" (no date).

Pace, Hugh W. "Valve Actuators Ready for Fieldbus," Control Engineer (Oct. 1995), pp. 65-73.

Pages from Aspentech.com website as of Apr. 1999, retrieved from Internet archive http://web.archive.org.

Pages from Aspentech.com website as of Dec. 1997, retrieved from Internet archive http://web.archive.org.

Pages from Aspentech.com website as of Dec. 1998, retrieved from Internet archive http://web.archive.org.

Pages from Aspentech.com website as of Jan. 1997, retrieved from Internet archive http://web.archive.org.

Pages from Aspentech.com website as of Oct. 1996, retrieved from Internet archive http://web.archive.org.

Pages from SL.com website as of 1999, retrieved from Internet archive http://web.archive.org.

Pages from SL.com website as of 2000, retrieved from Internet archive http://web.archive.org.

Pages from SL.com website as of Apr. 1999, retrieved from Internet archive http://web.archive.org.

Pages from SL.com website as of Dec. 1998, retrieved from Internet archive http://web.archive.org.

Pages from SL.com website as of Feb. 1997, retrieved from Internet archive http://web.archive.org.

Pappalardo, Denise, "Digi Introduces IP/IPX Router," InternetWeek, Apr. 24, 1995, p. 15.

Pappalardo, Denise, "Router Can Be Managed via Net," InternetWeek, May 22, 1995, p. 6.

Peshek, Clifford J., et al. "Recent Developments and Future Trends in PLC Programming Languages and Programming Tools for Real-Time Control," IEEE Cement Industry Technical Conference (May 1993) Toronto, Canada, pp. 219-230.

Petti, Thomas F. and Dhurjati, Prasad S. "A Coupled Knowledge Based System Using Fuzzy Optimization for Advisory Control," IChE Journal vol. 38 (Sep. 1992) No. 9, pp. 1369-1378.

Pfeifer T. and Fussel B. "Sensorbetriebssystem fur messtechnische Problemstellungen in der Produktionstechnik," Technisches Messen vol. 58 (1991) Nos. 7/8.

Phinney, Thomas L. "An Analysis of Contending Proposals in ISA SP-50 for an ISA/IEC Field Instrument Bus," ISA (1988) Paper #88/1489. (5 pages).

Pinto, Jim. "The Great Fieldbus Debate—is Over," Action Instruments (www.actionio.com) (originally published in Industrial Controls Intelligence, Nov. 1999).

Preface: Field Bus Process Control User Layer Technical Support, Feb. 10, 1993, pp. 1-8.

Product Specification, I/A Series® RBATCH II, Apr. 1995. (169 pages).

PROWAY-LAN Industrial Data Highway. (Approved Feb. 3, 1986) ISA—S72.01-1985, pp. 1-204.

Report from IEC TC65 Working Group 6 Function Blocks, May 1, 1995. (7 pages).

Rodriguez, Karen, "Tribe sets software," Interactive Age, vol. 2, No. 15, May 22, 1995, p. 25.

Scharf, Ronald, et al, "Using Mosaic for Remote Test System Control Supports Distributed Engineering," Institute of Computer-Aided Circuit Design—Test and Testsystems Division, University of Erlangen-Nurnberg, Germany, web page print-out from http://www.ncsa.uiuc.edu/SDG/IT94/Proceedings/CSCW/scharf/scharf.html (8 pages).

Silverman, Dwight. "'Attaboy' for the best software and hardware of 1994," The Houston Chronicle, Dec. 25, 1994, p. 2.

Skabowski, E. L. "Recommendations for Consideration at Oct. 1988 Application Layer Subcommittee Meeting," (Oct. 3, 1986). (17 pages).

Slater, A. F. "Controlled by the Web," Computer Networks and ISDN Systems 27 (1994) pp. 289-295.

SNAP Foundation Template "Using the SNAP Development Environment," Version 8.0, Chapters 1-4, 1997.

Solvie, Michael J. "Configuration of Distributed Time-Critical Fieldbus Systems," IEEE (1994), p. 211.

Soreide, N. N., et al. "Mosaic access to real-time data from the TOGA-TAO array of moored buoys," Computer Networks and ISDN Systems 28 (1995), pp. 189-197.

Stapleton, Nick. "802.3 Working Group DTE Power via MDI Call for interest," 3Com (Jul. 1999). (15 pages).

Stevens, et al. "TCP-IP Illustrated, vol. 1. The Protocols," *TCP-IP Illustrated* vol. 1, XP-002106390, 1993, pp. 85-96 (Chapter 7, "Ping Program").

Strack, Bob. "The HAWK is Soaring," *Chemical Processing* (May 1996) p. 11.

Strothman, Jim and Ham, John. "ISA/95 New Orleans: 'Open', NT winds (not Opal) blow strong," INTECH (Nov. 1995), pp. 45-48.

Strothman, Jim and Ham, John. "Alliances, Fieldbus, Windows Stir ISA/94 Anaheim Pot," INTECH (Dec. 1994), pp. 32-35.

Table of Contents, Automation & Technology Department, 1993. (11 pages).

Table of Contents, Automation & Technology Department, 1995. (20 pages).

Table of Contents, Industrial Computing Society (no date). (8 pages).

Table of Contents, ISA/88, Houston, TX, (1988). (9 pages).

Table of Contents, ISA/89, (1989). (10 pages).

Table of Contents, Proceedings of the Industrial Computing Conference, vol. 3, Sep. 19-24, 1993, Chicago, IL. Industrial Computing Society. (9 pages).

Taylor, "Object Oriented Information Systems", 368 pgs., Apr. 10, 1992.

Taylor, Ken and Trevelyan, James, "A Telerobot on the World Wide Web," printed from http://telerobot.mech.uwa.edu.au/ROBOT/telerobo.htm (14 pages) (1995).

The Foxboro Company, "FoxCMS Change Management System Software," 48 pgs., Aug. 14, 1996.

Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).

Tinham, Brian, "Getting SCADA by web browsner? Supervisory Control and Data Acquisition," Control and Instrumentation, No. 12, vol. 28, Dec. 1996, p. 5.

Tobin, David. "Southeast Paper Installs Largest Foxboro Distributed Control System." (no date) (3 pages).

Toner, Mike. "Web's view of world far and wide," The Houston Chronicle, Nov. 5, 1995, p. 6.

Tweney, "Java on Your Mobile Phone?", http://www.business2.com (Mar. 14, 2002).

Weinert, A., et al. "RT/OS—realtime programming and application environment for the COSY control system," Nuclear Instruments and Methods in Physics Research A vol. 352 (1994), pp. 277-279.

Welch, Nathalie, "Tribe to manage via Web; Tribe Computer Works Inc.'s TribeLink2 Product Announcement," MacWEEK, vol. 9, No. 21, May 22, 1995, p. 18.

WG1 List of Criteria (Appendix 1), (Oct. 21, 1988) ISA/SP50-1988-242, ISA Draft. (10 pages).

Wolfe, Alexander, "Strong Brew," Electronic Engineering Times, Apr. 8, 1996, p. 73.

Wood, G. G. "Current Fieldbus activities," computer communications vol. 11 (Jun. 1988) No. 3, pp. 118-123.

Wood, G. G. "Evolution of communication standards for the process industry," Measurement + Control vol. 19 (Jul./Aug. 1986), pp. 183-188.

Wood, G. G. "Survey of LANs and Standards," Computer Standards & Interfaces vol. 6 (1987), pp. 27-36.

Wood, G. G. "The Argus CONSUL System for On-Line Computer Control," Electrical Engineering Transactions (Mar. 1969), pp. 114-118.

Wood, G. G. "The Challenge of Standards for Plant Communication," IFAC Distributed Computer Control Systems (1982), pp. 191-192.

Wood, G. G. "Towards digital information control," Measurement + Control vol. 21 (Jul./Aug. 1988), pp. 179-180.

Wood, Graeme G. "Data Transmission, Processing and Presentation," pp. 46-54. (no date).

Wood, Graeme, G. "Standardisation Work for Communication Among Distributed Industrial Computer Control Systems—A Status Report," INRIA (1984), pp. 67-69.

Wood, Graeme. "Fieldbus Status 1995," Computing & Control Engineering Journal (Dec. 1995), pp. 251-253.

Wood, Graeme. "Generic Link Transactions for Simple Devices in Fieldbus." ISA/SP50—1988—240 (Sep. 20, 1988). (6 pages).

Zeff, Joe. "Maui Sunset in Real Time (Modems not Optional)," The New York Times, Nov. 27, 1995, Section D, col. 2, p. 5.

International Search Report and Written Opinion, PCT/US07/08005, Mar. 30, 2007, 20 pgs.

Pages from http://msdn.microsoft.com/en-us/library/default.aspx, downloaded Jan. 27, 2009, 1pg.

Pages from http://msdn.microsoft.com/en-us/office/aa905504.aspx, downloaded Jan. 27, 2009, 2pgs.

Pages from http://msdn.microsoft.com/en-us/magazine/2007.01.sharepoint.aspx, downloaded Jan. 27, 2009, 5 pages.

Pages from http://msdn.microsoft.com/en-us/library/ms495418.aspx, downloaded Jan. 27, 2009, 3pgs.

Pages from http://msdn.microsoft.com/en-us/library/ms570748.aspx, downloaded Jan. 27, 2009, 5pgs.

Pages from http://msdn.microsoft.com/en-us/magazine/2007.01.sharepoint.aspx, downloaded Jan. 27, 2009, 5 pages.

Pages from http://msdn.microsoft.com/en-us/library/ms495418.aspx, downloaded Jan. 27, 2009, 3pgs.

Pages from http://msdn.microsoft.com/en-us/library/ms570748.aspx, downloaded Jan. 27, 2009, 5pgs.

"TribeStar," web page print-out from http://www.tribe.com/products/tribestar/index.htm (3 pages).

"UDC 6000 Process Controller: From Stand-alone Control to Full System Integration Honeywell Has a Solution for You," Honeywell (no date).

"Unbundling the DCS" (no publication information) (7 Pages).

"User Layer Structure," SP-50 Technical Report (Jul. 25, 1990). (522 pages).

"User Layer Technical Report," ISA/SP50—1990-389C, ISA Draft. (24 pages).

"Wide-range, Fully Compatible Family of Process Automation & Management Systems," Copyright © 1993 by Elsag Bailey Group as an Unpublished Work. (24 pages).

"WWWF'94: Papers Received," web page print-out (Apr. 7, 2000) from http://www.ncsa.uiuc.edu/SDG/IT94/Agenda/Papers-received.html (8 pages).

Andrews, "15 MB in a Matchbook" (Jan. 1995) http://www.byte.com/art/9501/sec4/art5.htm.

ANSI/ASME PTC 19.1-1985, "Part 1—Measurement Uncertainty", Apr. 30, 1986, entire document.

Application of PRIAM Model to Safety Systems on Offshore Oil/Gas Platforms. Silvertech Ltd., Jan. 9, 1995.

Batch Control. Part I: Models and Terminology. (Approved Feb. 28, 1995) ISA-S88.01-1995.

Baxter, Richard V., Jr. "Implementing Open Networking in a Motor Drive," The Imbedded Internet Workshop Real World Applications Session (Oct. 1, 1999) San Jose, CA.

Beestermoller, H.J., et al. "An Online and offline programmable Multi-Loop Controller for Distributed Systems," IEEE (1994), pp. 15-20.

Benkhallat, Yazid, et al. "Interoperability of sensors and distributed systems," Sensors and Actuators A vol. 37-38 (1993), 247-254.

Blevins, Terry. "Characteristics of Function Block Requirements for the Process Industry and Manufacturing Automation," Fisher-Rosemount, Oct. 31, 1995. (pp. 2-4).

Browne, Malcolme W. "South Pole Ready for Internet Revolution," The New York Times, Section C, col. 1, p. 1, Jan. 10, 1995.

Brunn, P. "Collision Avoidance for Two Robots Sharing a Common Workspace," (1995) The Institution of Electrical Engineers. (36 pages).

Burton, P. I. "A personal history of batch control," *Measurement + Control* vol. 27 (Apr. 1994), pp. 69-73.

Burton, P. I., et al. "Field Bus Based on MIL-STD-1553B: Proposal to ISA-SP-50" ERA Technology Ltd. (Apr. 6, 1988) ISA/SP50-1988-148. (pp. 1-125).

Capetta, L., et al. "From Current Actuators and Transmitters Towards Intelligent Actuation and Measurement: PRIAM Approach," BIAS 93. (pp. 1-15).

* cited by examiner

PROCESS CONTROL METHODS AND APPARATUS FOR INTRUSION DETECTION, PROTECTION AND NETWORK HARDENING

This application claims the benefit of priority of U.S. Provisional Patent Applications Ser. No. 60/549,342, filed Mar. 1, 2004, and Ser. No. 60/588,622, filed Jul. 16, 2004, both entitled "Process Control Methods and Apparatus For Intrusion Protection and Network Hardening," the teachings of both of which are incorporated herein by reference in their entirety.

BACKGROUND OF THE INVENTION

The invention pertains to digital data processing and, more particularly, to process control methods and apparatus for intrusion protection and network hardening.

Today's production and other control environments (including environmental control, industrial control, and the like) rely heavily on computer-based control systems. Historically, the communications networks (the "process control networks" or "control networks") as they are sometimes called) over which the components of those control systems communicated was separate from the other business networks, e.g., the corporate LAN.

Increasingly, however, this is not the case. Current technology advances with open systems and the demand for information is driving tighter connectivity between these networks. Devices in use on the process control network have the ability to gather real time information about the process and have the ability to adjust to commands from the business network. More and more, enterprises are leveraging this to improve efficiency and intra-organizational transparency.

Whereas it had traditionally been secured and protected from the threat of virus and worm infections by the fact of isolation, the control network is now increasingly at risk as a result of network convergence. This is because many control systems share the same underlying operating systems as are used in the business network. Compounding the problem is that many of today's control networks have been implemented in pieces. Most have no consistent security design and many were not designed for security.

As a consequence, the threats from both internal and external sources have increased significantly. Ernst & Young reported in their "Information and Security Survey" that 60% of organizations expect to experience greater vulnerability as connectivity increases.

There are, of course, numerous reasons to protect the control network and control system from threat. The technical knowledge, skills and tools required to penetrate business networks are widely available. If applied to the control network of, say, a refinery or nuclear power plant, the results could be devastating. In addition, there are increasing regulatory mandates and guidelines being issued the US Government (National Strategy to Secure Cyberspace—US Government page 32), as well as guidelines and best practices for securing plant control systems from advisory groups, such as ISA SP99 committee, NIST (Process Control Security Requirements Forum—PCSRF), NERC (North American Electric Reliability Council), among others.

An object of the invention is accordingly to provide improved methods and apparatus for digital data processing.

Another object is to provide such methods and apparatus as improve network hardening and/or provide further protection against network intrusion.

A still further object of the invention is to provide such methods and apparatus as can be implemented in the range of production environments extant today and in the future.

Yet a further object of the invention is to provide such methods and apparatus as can be utilized on a range of control networks.

SUMMARY OF THE INVENTION

The foregoing are among the objects attained by the invention which provides, in one aspect, an improved network for use in or with process control systems, computer-based manufacturing or production control systems, environmental control systems, industrial control system, and the like (hereinafter, collectively, "control systems"). Those networks utilize a combination of firewalls, intrusion detection systems, intrusion protection devices and/or other devices for defense against intrusion, or hardening.

For example, according to one aspect of the invention, digital data communications within a site (e.g., a plant or corporate facility) is supported by a network that is divided into two or more zones. One of those zones is a control network comprising control workstations, controllers, field devices and other process, manufacturing/production, environmental and/or industrial control equipment, or the like (collectively, "control devices") and network media supporting communications therewith and/or therebetween.

The other zone is a network having different connectivity requirements and/or traffic patterns than the control network. It may be, for example, a corporate local area network (LAN), an enterprise wide area network (WAN) or other business network (e.g., comprising personal computers, mainframe computers, personal digital assistants, servers, scanners, printers, and the like). It may also be coupled to the Internet or other public network, by way of non-limiting example. The site (or plant) network is segmented into those zones via firewalls, e.g., located at the respective zone boundaries. Intrusion detection and/or prevention systems are deployed at selected locations in and/or between the zones for (i) reporting network traffic indicative of potential intrusions, and/or (ii) blocking such traffic.

Related aspects of the invention provide a control network that divided into hierarchical zones, each providing differing security. For example, according to some aspects of the invention, such a network can be divided into a public (or Internet) zone, having the least security (relative to the other zones); a Data Center zone, providing more security (than the Internet zone), a Plant Network zone, providing still greater security (than the Internet and Data Center zones), and a Control Network zone, having the greatest security (relative to the other zones). Each zone is separated from the other zones, e.g., by a firewall or like device and, optionally, by an intrusion detection or protection system.

Further aspects of the invention provide control networks as described above in which firewalls (or like devices) that separate zones are sourced from manufacturers (or other sources) that differ from the firewalls (or like devices) used at the network perimeter.

Other aspects of the invention provide networks (for example, control networks, hybrid networks comprising both business zones and control zones, all by way of non-limiting example) as described above in which the intrusion detection and/or protection systems that separate the zones implement different security protocols from one another.

Where those protocols are signature-based, for example, a first such protocol can be used to implement security in zone that defines the "business" (or other enterprise-level) network and a second, separate signature-based protocol can be used in a zone in which workstations, controllers, field devices and other process control equipment communicate, e.g., with field devices and other process control equipment (i.e., the "control network" zone).

Still other aspects of the invention provide networks as described that provide improved intrusion protection. These networks incorporate firewalls or other intrusion protection devices in-line within each network or zone being protected. Alternatively, and/or in addition, the networks can incorporate workstations (or other host digital data processors) that implement host-based intrusion protection.

In other aspects, the invention provides control networks (or hybrid corporate/control networks) as described above that implement intrusion detection in addition to—or instead of—intrusion protection.

Related aspects of the invention provide methods and apparatus for signature-based intrusion detection and/or protection, e.g., in control networks. These utilize signatures unique to control networks to detect actual or apparent intrusions.

Yet other aspects of the invention provide methods for hardening process control systems and applications against hacking, intrusion or other mischievous conduct. According to one aspect of the invention, this includes one or more of selectively deactivating operating system and other services (e.g., ftp, etc.) that are and may not be necessary for normal and/or expected process control operation; executing a backup (e.g., preferably an incremental backup) to preserve current system status; testing system and/or application execution to determine whether it achieves normal and/or expected operation.

In related aspects of the invention, the aforementioned services are selectively and successively deactivated in order to harden the systems and/or applications. System (or application) operation is tested after each deactivation (and/or group of deactivations) until, preferably, all services not essential to normal and/or expected operation have been identified and deactivated. If testing reveals that a given deactivation (or group of deactivations) results in unexpected system (or application) operation, one or more of the services are re-activated and the methodology is resumed with the selectively and successive deactivation of other services.

According to a related aspect of the invention, once all services not essential to normal and/or expected operation are deactivated in accord with the methodology described above, the system is tested for penetration, e.g., in the manner of a hack, intrusion and/or other mischievous action. If penetration is occurs, additional services are deactivated and penetration testing re-executed.

Related aspects of the invention provide process control systems and devices (including, workstations, field devices, intrusion detection and/or intrusion protection systems) hardened against hacking, intrusion or other mischievous conduct in accord with the above methodology.

These and other aspects of the invention are evident in the detailed description that follows.

BRIEF DESCRIPTION OF THE DRAWINGS

A further understanding of the invention may be attained by reference to the drawings, in which.

DETAILED DESCRIPTION OF THE ILLUSTRATED EMBODIMENT

Figure 1:
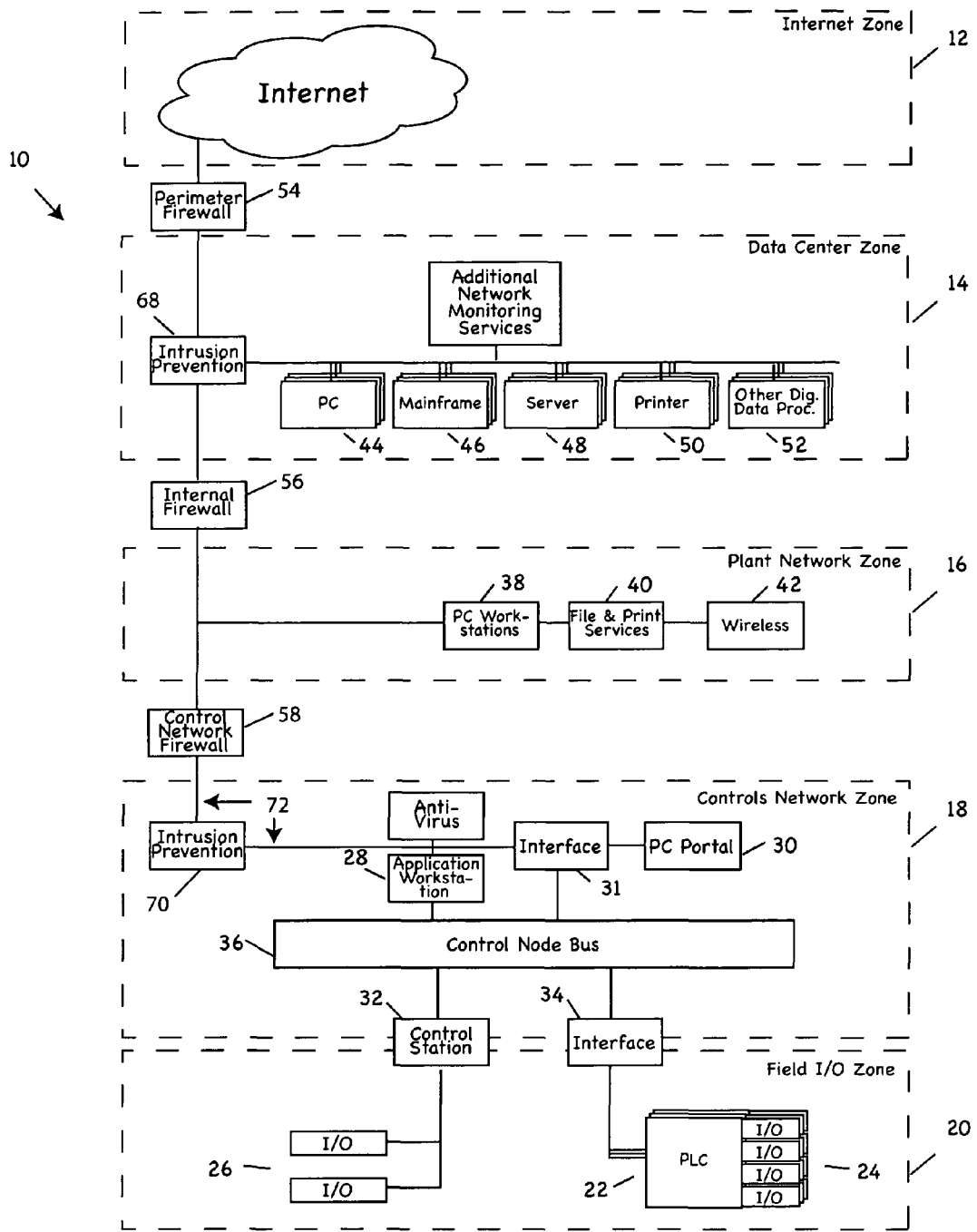
FIG. 1 depicts a network according to the invention supporting digital data communications between and/or with devices, e.g., located at a site such as a plant or corporate facility.

FIG. 1 depicts a network 10 according to the invention supporting digital data communications between and/or with devices, e.g., within an enterprise and/or located at a site, such as a plant or corporate facility, all by way of non-limiting example. Those devices and the portions of the network 10 supporting them are divided into five zones, though in other embodiments there may be greater or fewer. In the illustrated embodiment, those zones comprise an internet zone 12, data center zone 14, plant network zone 16, controls network zone 18 and a field I/O zone 20, though, in other embodiments the identity and nature of those zones may vary.

Illustrated field I/O zone 20 comprises control devices, such as programmable logic controllers 22 and field or input/output (I/O) devices 24, 26, by way of non-limiting example, of the type commonly used to monitor and/or control manufacturing, environmental, industrial and/or other such processes and/or apparatus in process control systems, computer-based manufacturing or production control systems, environmental control systems, industrial control system, and the like (hereinafter, collectively, "control systems"). The control devices 22, 24, 26 are coupled to actuators, sensors, and the like, e.g., that make up the system being controlled and/or form part (or the whole of) those actuators, sensors, and the like, themselves.

Communications on those portions of the network 10 in zone 20 are typically direct hardwired communications between the I/O devices and their controllers. Other embodiments may utilize wireless or other forms of communication. In addition, they may include other control devices and/or provide other functionality, in addition to or instead of the devices and/or functionality shown in the drawing and discussed herein.

Illustrated controls network zone 18 comprises higher-level control devices, such as applications workstation 28, personal computer 30 (and interface 31, as necessary) and/or other digital data processing equipment that execute applications to provide a monitoring and control interface to the control devices in zone 20. The digital data processors in this zone 18 may provide historical tracking functions, alarming capability and so forth, all in the conventional manner known in the art. The workstation 28, PC 30 and/or other digital data processing apparatus of zone 18 communicate with other nodes of the control system, e.g., control station 32 and PLC interface 34, via a control node bus 34 or other interconnect of the type known in the control arts and, preferably, utilizing a communications protocol standard thereto. Other embodiments may provide, in zone 18, other digital data processing apparatus and/or provide other functionality (such as illustrated anti-virus service and/or other monitoring services), in addition to or instead of that of devices 28 and 30 shown in the drawing and described above.

In the illustrated embodiment, zone 18 additionally includes and intrusion protection and/or intrusion detection functionality as described below. This is disposed on the "side" of zone 18 that interfaces with the plant network zone 16 and, more generally, one or more business networks of the enterprise. The network media supporting communications on this side of zone 18 may be configured as a local area network (LAN) and, possibly, as a wide area network (WAN), or other network arrangement known in the art, and may include Ethernet and/or wireless (among other media) supporting TCP/IP and other protocols.

At the interface of zones 18 and 20 of the illustrated embodiment are control station 32 and PLC interface 34, both of conventional construction and operation known in the art. Thus, for example, control station 32 of the illustrated embodiment executes control algorithms, e.g., under monitoring and/or supervisory control of applications workstation 28, PC 30 or other digital data processing apparatus, while interface 34 provides communications coupling between that workstation 28, PC 30 and other digital data processing apparatus, e.g., via bus 36. Other embodiments may provide other functionality, in addition to or instead of that of devices 32 and 34, at the interface of zones 18 and 20, or subsume that functionality into other apparatus present within those zones.

Typically, and in the illustrated embodiment, zones 18-20 comprise devices and network media largely (if not entirely) disposed at a single site, such as a plant or other corporate facility, though in other embodiments this may vary. Thus, for example, the devices and network of zones 18-20 may extend over a corporate campus or other geographical region; conversely, they may extend over just a portion of the physical premises of a single facility. Regardless of their actual physical or geographical coverage, network portions 18-20, and devices/applications placed in communications coupling thereby, are referred to here as the "process control network" and, more generally, the "control network."

Illustrated plant network zone 16 comprises personal computers 38, servers 40, wireless access services 42 and other digital data processing equipment of the type commonly used to support business applications and functions connected with a manufacturing, environmental control, industrial or other operation in which control systems are employed. Those applications can include, by way of non-limiting example, messaging, ERP, file & print sharing, and Internet browsing, and so forth. The digital data processing apparatus in this zone 16 may also support engineering, scientific and/or other computing applications and function used in connection with such operations. Other embodiments may provide, in zone 16, other digital data processing apparatus and/or provide other functionality, in addition to or instead of that of devices 38-42 shown in the drawing and described above. For example, this zone may include intrusion protection and/or intrusion detection functionality as described below. The network media supporting communications in zone 16 is typically configured as a local area network (LAN), wide area network (WAN), or other network arrangement known in the art, and includes Ethernet and/or wireless (among other media) supporting TCP/IP and other protocols, as is conventional in corporate or business networks.

Zone 16 may comprise devices 38-42 and network media largely disposed at the same "site" as the zones 18, 20. However, this zone may, too, span a different and/or wider geographical area, e.g., over multiple locations across a wide area network or otherwise. Regardless, and unless otherwise apparent from context, the terms "site," "plant" and "facility" are used synonymously throughout this application—as are the corresponding terms "site network," "plant network," "facility network," or the like, referring to network zone 16 of the illustrated embodiment and the devices 38-42 and applications placed in communications coupling thereby.

Illustrated data center zone 14 comprises personal computers 44, mainframe computers 46, servers 48, printers 50, and other digital data processing equipment 50 of the type commonly used to support business, governmental, or other enterprise operations. The devices 44-52 may support applications and functions of the type discussed above in connection with the plant network zone 16 or others applications and functions, all as is common in enterprise operations. Data center zone 14 may include additional services, e.g., implemented by a dedicated server or other device. These services include, by way of non-limiting example: network monitoring, content filtering, anti-virus, remote access, server monitoring, web usage reporting, wireless security, service level management, user management, server management, and/or antispam. In the illustrated embodiment, zone 14 additionally includes and intrusion protection and/or intrusion detection functionality as described below. The network media supporting communications in zone 14 is typically configured as a local area network (LAN), wide area network (WAN), or other network arrangement known in the art, and includes Ethernet and/or wireless (among other media) supporting TCP/IP and other protocols, as is conventional in corporate or business networks.

As above, zone 14 may comprise devices 44-52 and network media largely disposed at the same "site" as the zones 18, 20. As with zone 16, however, zone 14 may, too, span a different and/or wider geographical area, e.g., over multiple locations across a wide area network or otherwise. Regardless, the terms "enterprise network," "organization network," or the like, may be used to refer to network zone 14 of the illustrated embodiment and the devices 44-52 and applications placed in communications coupling thereby. More generally, the term "business network," "corporate network," or the like is used to refer to network zone 14 (and its associated devices and applications), network zone 16 (and its associated devices and applications), or the combination thereof.

The media used network 10 may be of the wired, wireless, or other varieties known in the art, or combinations thereof, for supporting communications between, to and/or from the illustrated devices. For sake of convenience, that media is referred to in the plural (to wit, "media") regardless of whether it constitutes one or more varieties and/or whether it constitutes a single network segment or multiple segments.

Internet zone 12, in the illustrated embodiment, represents a public network, such as the Internet, or other network external to the enterprise or site and not subject to the network security measures discussed herein.

Network Segmentation

The illustrated embodiment takes a new approach to intrusion prevention for control systems and the control networks that embody them. That approach focuses on placement of firewalls, intrusion detection and prevention systems within and between control networks (e.g., zones 18-20) and the business (or other) networks (e.g., zones 14-16) with which those control network interface, e.g., at the site level and, more broadly, the enterprise level. Such combined networks are referred to herein as "hybrid networks," "hybrid control/business networks," and the like.

Segmentation of illustrated network 10 into the several zones 12-20, each of which has different a different set of connectivity requirements and traffic patterns, is attained through the use of firewalls, intrusion detection and prevention systems deployed as discussed below. Those zones provide the following levels of overall security:

Field I/O Zone 20—Communications that occur in this zone are typically direct hardwired communications between the I/O devices and their controllers. Security is accomplished by physical security means.

Controls Network Zone 18—This is the zone with the highest level of security. It is the network that carries the process control device communications. Traffic on this network segment must be limited to only the process control network traffic as it is very sensitive to the volume of traffic and protocols used.

Plant Network Zone 16—This zone carries the general business network traffic, (messaging, ERP, file & print sharing, and Internet browsing, etc.) This zone may span multiple locations across a wide area network. Traffic from this zone may not directly access the controls network zone 18.

Data Center Zone 14—This may be a single zone or multiple zones that exist at the Corporate Data Center.

Internet Zone 12—This is the unprotected public Internet.

Apart from the interface between the control network zone 18 and the field I/O zone 20, each zone is separated from the adjacent zones by a firewall. Thus, in the illustrated embodiment, perimeter firewall 54 separates internet zone 12 from data center zone 14. This is a firewall that controls the types of traffic to and from the public Internet.

Internal firewall 56 separates data center zone 14 from plant network zone 16. This is a firewall that controls the types of internal site-to-site traffic and site-to-data center traffic. It facilitates controlling or containing the spread of network born viruses, and provides an extra level of restricting the types of traffic that is allowed between sites. It also gives the ability to further protect the datacenter from internal intruders.

Control network firewall 58 separates plant network zone 16 from controls network zone 18. This is a hardware device which restricts the types of traffic allowed into and out of the control network zone 18. Rules are created in the firewall configuration to allow only the permitted traffic. The general rule of thumb is "deny everything and permit only the essential traffic."

The firewalls 54-58 are preferably managed in a consistent fashion to ensure that changes are documented. They are also preferably monitored 7×24, whether by a group within the enterprise or a third party provider. Appropriate event alerting and rectification process is put into place so that alerts are noted and can be acted upon. The firewalls 54-58 are also preferably configured to utilize a logging server to capture all firewall events either locally or in a central location. In preferred embodiments, the firewalls 54-58 are not used for services other than firewalls or VPN connectivity.

While the diagram illustrates a single firewall between each zone, additional ones may be utilized: e.g., a pair of high availability units in a fail over mode. Thus, for example, in implementations that require real-time or near real-time communications to the "Process Control Network"—a term used, here, to refer to the combined control network zone 18 and field I/O zone 20; though, in other embodiments, that term may refer to a single one of these zone or another combination (such as zones 16-20, or 16-18)—it is preferred that firewall 58, at a minimum, be a high availability or redundant unit.

Firewalls 54-58 can be of the type commercially available in the marketplace, albeit operated and arranged as discussed herein. In some embodiments, the security of zones 16-20 is enhanced by selecting a perimeter firewall 54 that is of a different manufacturer than firewalls 56, 58, since this typically provide maximum resistance to penetration.

Figure 2:
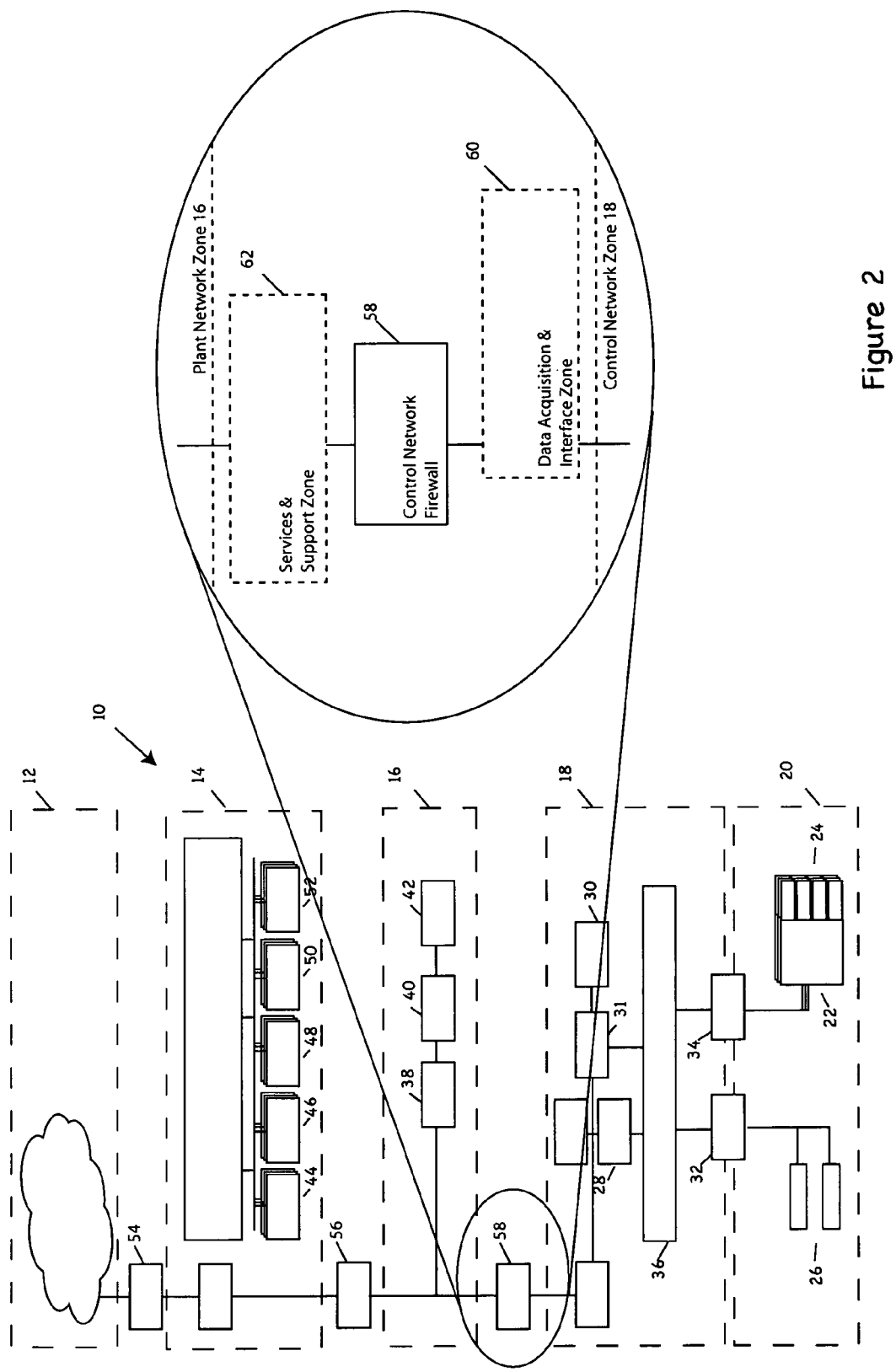
FIG. 2 depicts exemplary subzones between a plant network zone and a control network zone in a network of FIG. 1.

In practice, the firewalls can be configured to create additional zones, or subzones, to supplement the illustrated configuration. Referring to FIG. 2, two exemplary subzones 60, 62 are shown between the plant network zone 16 and the control network zone 18. Those skilled in the art will appreciate that other subzones can be used in addition or instead:

Data Acquisition & Interface Sub-Zone 60—This sub-zone is the demarcation point and interface for communications into or out of the Process Control Network (e.g., into or out of controls network zone 18). It contains servers or workstations that gather data from the controls network zone 18 devices and make it available to the plant network zone 16.

Service & Support Sub-Zone 62—This sub-zone is utilized, e.g., by support agencies when servicing the controls network zone 18. Like other connections to the Internet or other external network, this connection preferably uses strong authentication, encryption or secure VPN access. Modems utilized preferably incorporate encryption and dial back capability. Firewalls and other devices introduced to the network 10 in support of this zone preferably utilize updated anti-virus software.

Figure 3:
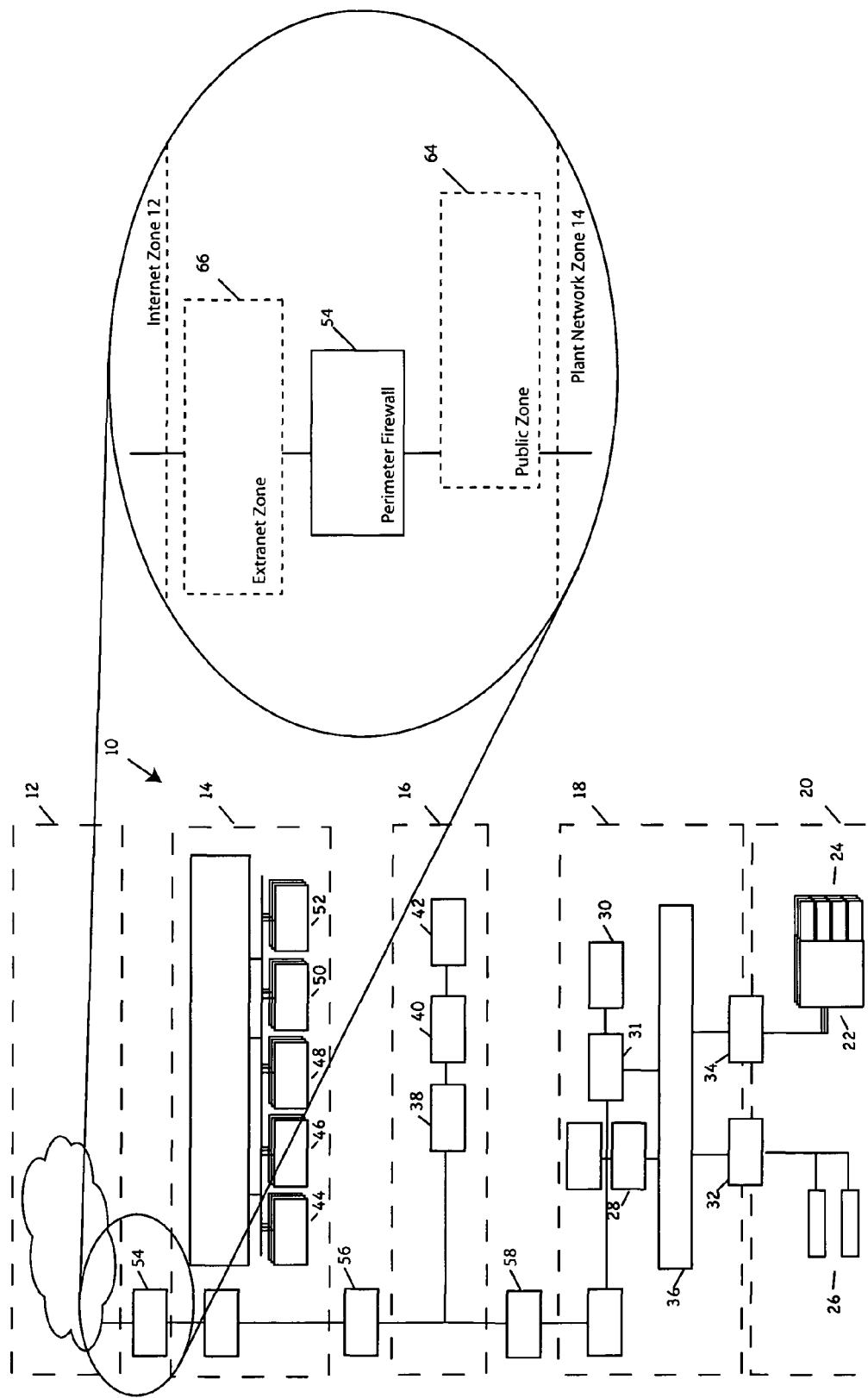
FIG. 3 depicts exemplary DMZs established between a data center zone and a public network in a network of FIG. 1.

Referring to FIG. 3, the perimeter firewall 54 can define "demilitarized zones" (DMZs) like those discussed below. As above, those skilled in the art will appreciate that other subzones can be used in addition or instead:

Public Sub-Zone 64—This is a sub-zone where public facing services exist. Web servers, SMTP messaging gateways and FTP sites are examples of services found in this sub-zone.

Extranet Sub-Zone 66—This is a sub-zone that is commonly used to connect to the business (or other organizational partners) of the enterprise (e.g., trading partners, customers, and so forth). These "partners" connect by various methods including dialup, private lines, frame-relay and VPN. VPN connections are becoming more common due to the proliferation of the Internet and the economy of leveraging shared services. Rules established in firewall 54 are used to further control where the partners are allowed to access as well as address translation.

Illustrated network 10 also includes intrusion detection system (IDS) and/or intrusion protection system (IPS) devices to detect signatures or patterns on the network that would indicate unusual traffic patterns. These are placed within the zones, e.g., IPS 68 within data center zone 14 and IPS 70 within control network zone 18, as shown in FIG. 1. IDSs may be used instead or in addition.

As those skilled in the art will appreciate, IDSs monitors packets on a network wire and determine if the seen activity is potentially harmful, such as a worm attack. A typical example is a system that watches for large number of TCP connection requests (SYN) to many different ports on a target machine, thus discovering if someone is attempting a TCP port scan. An IDS may run either on the target machine who watches its own traffic or on an independent machine such as an IDS appliance (also referred to as Host IDS).

An Intrusion Protection System (IPS) encompasses the same monitoring techniques used in IDS; however, it includes the ability to block the traffic that is deemed harmful. It prevents attacks from causing harm to the network 10—and, particularly, those portions of the network within zones 18 and 20, as well as the control system with which they interface—as a consequence of being positioned in-line, between the network media and devices being protection, on the one hand, and less secured networks, on the other hand. Like IDSs, IPSs can run in host mode directly on the control system station.

Additional devices for use in some implementations of network 10 are discussed below:

Routers: A device which forwards packets between networks. The forwarding decision is based on network layer information and routing tables, which are constructed either manually or automatically by routing protocols. Based on network requirements, routers may be utilized to connect the various network zones or segments either directly or utilizing telecommunications links. In preferred embodiments of the invention utilized in plants and similar environments, routers are typically not configured with access lists to mimic firewall functionality on a basic level. This is because routers lack a hardened operating system and do not have the robust capabilities of a true firewall.

Hubs: A multi-port broadcast device. It takes whatever comes in any port and broadcasts it out all the other ports. As network nodes are added or traffic increases, every node on the segment has a greater chance of slowing communication or having a collision. Additionally, since Ethernet nodes currently do not differentiate between the relative importance of Ethernet packets, it is possible for non-essential traffic on the network to slow or collide with essential traffic (such as inter-PLC communication, or HMI polling.) Switches Bridges: Bridges act as "gatekeepers" between two collision domains. By being physically wired into both LANs, this device is able to discern the source and destination address of an Ethernet packet. The bridge is also capable of "mapping" the locations of Ethernet nodes on either side of itself. By linking a control network and an office network with a bridge, traffic can be stopped that is meant to travel between two computers in the office LAN from burdening devices on the other side of the bridge. When traffic occurs that is addressed for a device on the other side of the bridge from the originating address, the bridge will allow this traffic to pass. Compared to the completely shared network, the bridged network can reduce, but not eliminate, the opportunity for collisions and network slowdowns.

Switches: A switch is a multiport device which has the ability to "read" the address portion of an Ethernet packet and then send the packet out the port on which the destination node resides. Most modern switches have buffers that allow them to store and forward the Ethernet packets that are sent to it. Each port of the switch can connect either directly to a node or to a hub(s) which can also have multiple nodes connected to it. Modern switches are capable of learning the unique addresses of devices attached to them or to a hub which in turn is then attached to the switch without any programming. If a PC or PLC is plugged directly into a switch, the switch would only allow traffic addressed to that device to be sent down the connection cable to the device. By controlling the flow of information between ports, switches improve bandwidth utilization by reducing the number of collisions. It is important to note that the control network communicate using the MAC address layer and that some consumer grade switches do not fully implement the standard and may not allow these devices to communicate. Generally speaking commercial grade switches do not have this issue.

Media Converters/Media Access Unit (MAU)—Devices utilized to connect various media types such as fiber to ThinNet to form a contiguous network.

Modem—Devices utilized to connect devices asynchronously for out of band access to devices. In embodiments of the inventor used in plants and plant-like environments, modems are equipped for dial back and employ encryption techniques.

Wireless Access Points—Radio base stations that are used to connect to the hardwired network. The illustrated network 10 utilizes securely implemented wireless. Solutions provided are capable of both preventing unauthorized access and ensuring that data transmitted is encrypted to prevent "eavesdropping". For maximum flexibility, the devices selected are capable of data encryption with dynamic or rotating keys, MAC address filtering & blocking, disabling SSID broadcasting, and complies with 802.11 & 802.1x standards. Consumer grade equipment is not preferred. Moreover, VPN connections are established with software clients in lieu of WEP or proprietary data encryption. This allows supporting multi-vendor wireless hardware with a common solution.

VPN Concentrators—Devices that encrypt the data transferred between the concentrator and another concentrator or client based on a mutually agreed upon key. This technology is most wildly used today to allow remote users to securely access corporate data across the public Internet. The same technology can be used to add additional security accessing data across wireless and existing corporate WANs. In lieu of a separate VPN concentrator, it is possible to utilize VPN services that are integrated with the firewall.

Firewall Configuration

Firewalls utilized in the network 10 are configured as described further below. Firewall selection, ruleset configuration and operational policies are made with respect to I/A Series process control systems (available from the assignee hereof, Foxboro/Invensys plc), network and its interfaces to a corporate network (e.g., including an Ethernet network topology), though it will be appreciated that such selections, or the like, are applicable to systems, networks and interfaces from other sources.

Demilitarized Zones (DMZs)

In the illustrated embodiment, perimeter or external firewall 54 is used to create special isolated zones referred to as demilitarized zones (DMZs). A DMZ is a small network inserted as a "neutral zone" between a company's private network and the outside public network. This DMZ contains public facing web or ftp servers. While this DMZ is an optional zone, it provides a more secure approach. It gives greater flexibility and much finer granularity for the firewall ruleset to further control the traffic that flows through it. Firewall 54 can be used to create DMZs for other applications, as well. An example is to create an Extranet DMZ. As noted above, this can be used enterprise's partners, restricting what they can access on the company network.

The inventors have extended this to the internal firewall used to isolate the control network. Referring back to FIG. 2, firewall 58 is located between the plant or business network (zone 16) and the control network (zones 18, 20). DMZ 60 is created that contains the data collection and reporting servers, which will be accessible from the business network (zone 16). Only these servers will be allowed to communicate with the control network (zones 18, 20). DMZ 62 is also created to permit control of the control network via remote administration and service connections.

Firewall Rules

Firewalls within network 10 are configured using rules, i.e., definitions of what types of traffic should be allowed in or out of the secured network zones. While the exact method of configuring the firewall varies from firewall manufacturer to manufacturer, the illustrated embodiment utilizes one (or more) of the following rules to restrict the traffic to the network zones. Where possible (e.g., permitted by the specifics of the firewall design), multiple rules are combined to provide more in-depth protection.

Packet Filter

A packet filter is a type of firewall. Packet filters can restrict network traffic and protect the network by rejecting packets from unauthorized hosts, using unauthorized ports or trying to connect to unauthorized IP addresses. Packet filters only check the packet header to determine the source and destination address and the source and destination ports to verify against its rules.

Stateful Inspection

Stateful Inspection packet filtering or Stateful Packet Filtering (SPF) is a more in-depth form of a packet filter firewall. Stateful Inspection firewalls check the packet all the way to the Application Layer and monitor incoming and outgoing packets to determine not only source and destination, but also context. This ensures that only requested information is allowed back in. Stateful Inspection helps protect against hacker techniques such as IP spoofing and port scanning.

SPF first looks at more details from each packet than packed filtering. This allows the determination of what is contained within the packet rather than simply who and where it is from (or allegedly from). SPF monitors communications between the two devices and compares the traffic not only to the rules it has been given, but also to the previous communications. If any communication seems out of context or out of the ordinary based on previous traffic the packet is rejected.

Proxy

A proxy service is generally put in place to boost performance of the network, but can act as a sort of firewall as well. The proxy service hides internal addresses so all communications appear to originate from the firewall itself. The proxy has the ability to provide faster user response by maintaining a cache of recently requested pages locally.

For example, If user A goes to google.com the proxy actually sends the request to google.com and retrieves the web page. When user B initiates a request to connect to google.com, the proxy sends the information it has already retrieved for user A. The proxy has algorithms to ensure that current data remains in the cache. The effect is that the page is returned much faster to the user than having to get it from google.com again.

A proxy can also be configured to block access to certain web sites and filter certain port traffic to protect the internal network.

There are two types of solutions that are called Proxy servers. One is an application that is loaded on a PC based server. The second is a feature incorporated into a firewall. For purposes of the illustrated embodiment, the application that is loaded on a PC server is not generally considered a solution for providing security on the network 10 (and, particularly, the control network), but does provide the acceleration benefits outlined above. More generally, in embodiments where a proxy is used, it is incorporated into a hardened firewall solution.

Application Gateways

Application gateways are a variation of a proxy server and functions as follows: The internal client first establishes a connection with the application gateway. The application gateway determines if the connection should be allowed or not and then establishes a connection with the destination computer. All communications go through two connections: 1.) client to application gateway and 2.) Application gateway to destination. The application gateway monitors all traffic against its rules before deciding whether or not to forward it. As with the other proxy server types, the application gateway is the only address seen by the outside world so the internal network is protected.

Firewall Rules Design

Firewall rules utilized in the network 10 were set with a policy that started with a totally locked down configuration (i.e., where nothing is permitted thru the firewall). Then, only the minimum ports necessary for the requisite applications to function were opened. The policy by which those rules were developed, further, called for identifying data flow requirements from all zones (12-20). In this regard, suppliers of software used in the network were typically relied on toe provide port and protocol information about their application. Where that was not possible, network sniffers were employed to identify the ports and protocols used.

The aforementioned lockdown policy was extended into the DMZ, e.g., 60, 62, of the illustrated embodiment. This is unlike prior art practices, where firewall ruleset designers take a false sense of security with DMZ and allow too many ports to be opened. The inventors have discovered that it is necessary to keep in mind what risk is presented if the server in the DMZ is compromised.

Equipment Selection

Firewalls 54-58 utilized in the illustrated embodiment are reliable. Preferably, they do not utilize disk drives and other mechanical components and, therefore, have a lower probability of failure. Alternatively, or in addition, high availability options are utilized in embodiments where communications with the control network (zones 18, 20) are critical and requires 100% uptime. In any given implementation, this is evaluated at the risk assessment stage of design: will the control network continue to operate if connectivity to the business network is lost?

Management of Firewalls

The firewalls of the illustrated embodiment are actively managed. They are updated, for example, when manufacturer updates are released. Their event logs are monitored, as these events are good indications of someone or something that is trying to access devices across the firewall that is outside of the rules. While this is usually an indication of a misconfigured application, it may also be an indication of a worm or a possible intruder on the network. Monitoring may be by person or person internal to the enterprise, or an outsourced to a partner.

Configuration Management

The illustrated embodiment utilizes a policy for firewall configuration and change management. This provides accountability for the changes made to the firewall ruleset. Documentation of the types of rule changes, when and why they were made are kept. Thus, for example, when additional ports are opened, e.g., to test for compatibility with new applications and/or devices on the network, a log of those ports is kept in order to insure that unnecessarily opened ones will subsequently be closed.

Using Firewalls For Other Services

The firewalls of the illustrated embodiment and, particularly, firewall 58 protecting the controls network zone are not utilized for other than firewall services. In this regard, it will be appreciated that it is possible to utilize the firewall to provide other services such as virus scanning or spam filtering. The inventors have found that this is not a recommended practice, particularly within the process control environment defined by firewall 58. In some embodiments, however, that firewall can support a limited number of VPN connections to provide access to the control network from clients within the business network (e.g., once all security implications are taken into account).

Security Hardening

Hardening of network 10 is achieved by following principles of designing and developing multiple layers of network, system and application security; exercising prevention within control system networks, supported by detection; viewing security from both management and technical perspectives; ensuring security is addressed from both an IT and control system perspective; and/or ensuring industry, regulatory and international standards are taken into account. In preferred embodiments of the invention, as many of these principles are exercised in network implementation as can be (given the particulars of the site).

The aforementioned I/A Series systems are deployed on two platforms: Sun Solaris and Microsoft Windows operating software. Securing these effectively requires striking a balance between the degree of security and the level of usability and functionality required. Although there are exceptions to the following general rule, it is often true that as the security and reliability of a computer system increases, its usability and functionality decreases. As the Sun Solaris and Microsoft Windows include security features at their core (including the ability to disable or enable operating software services), the initial approach to improving security of the network 10 and, particularly, for example, the control network (zones 18, 20) involved determining security settings that could be tuned without negatively affecting operational requirements of the devices and applications in the relevant zones on the network.

Figure 6:
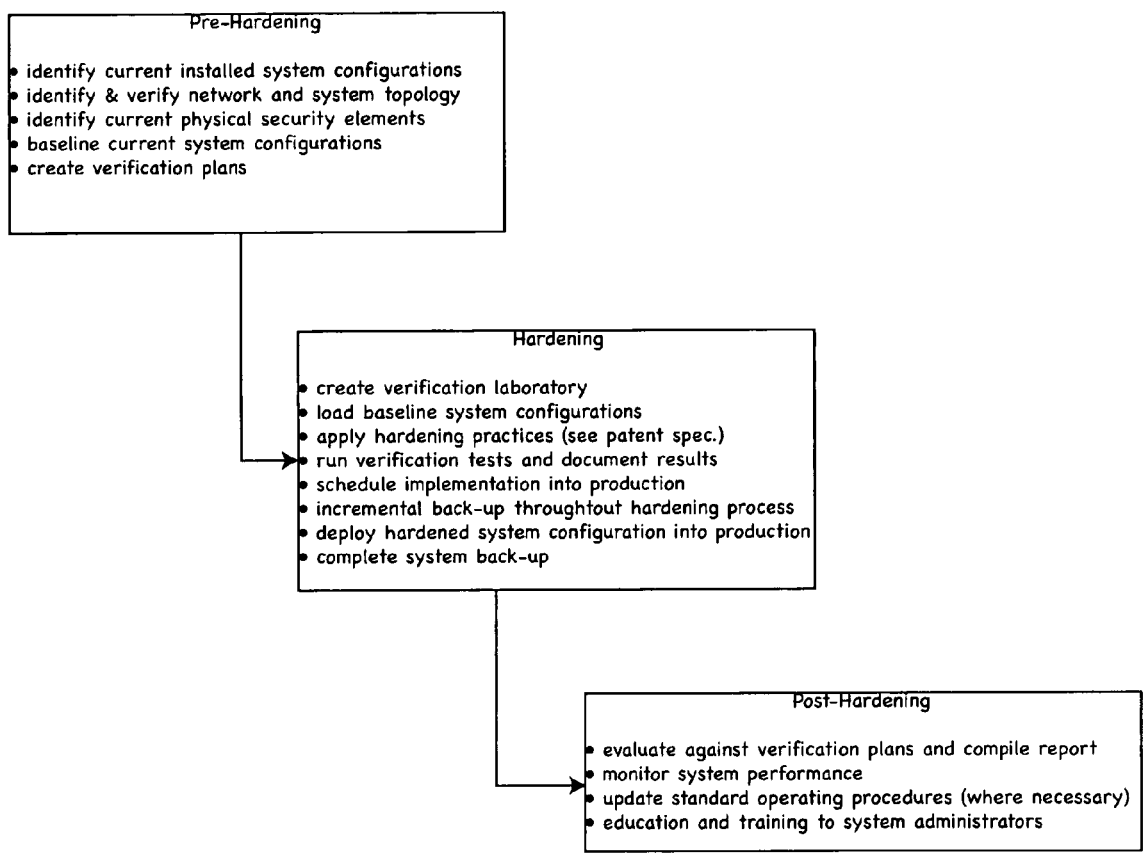
FIG. 6 illustrates a procedural approach to hardening the network of FIG. 1.

FIG. 6 illustrates a procedural approach to hardening network 10. This is applicable to control networks, as well as hybrid business/control networks as illustrated in FIG. 1.

Intrusion Detection and Prevention

The illustrated embodiment takes a new approach to intrusion prevention for control systems and the control networks (e.g., zones 18, 20) that embody them. That approach focuses on placement of intrusion detection and prevention systems within and between control networks and the business or other networks (e.g., zones 14, 16) with which those control network interface, e.g., at the site level and, more broadly, the enterprise level.

Intrusion Detection

In some embodiments, network 10 uses Intrusion Detection Systems (IDS) where the control system network, e.g., network zones 18, 20 (and other critical networks) are connected to TCP/IP-based local and wide area networks, e.g., zones 14, 16. These IDSs detect adverse network activity—such as hacking attempts, virus and worm attacks, and other potentially threatening traffic capable of wreaking havoc on process control systems—and, when detected, generate an alert indicating that a threat has been detected.

Preferred IDSs used in embodiments of the invention detect threats through "signature" detection. Signatures are a collection of known symptoms of a known attack. For example, a signature attack would be if a hacker is attempting multiple passwords to access a system. IDS systems used in the illustrated embodiment, for example, can detect that someone is connected to a system and is receiving numerous "bad password" or "login failure" messages, often signaling a hack attempt. IDSs providing this capability are available in the marketplace; signatures used in the illustrated embodiment for protecting control networks are detailed below.

To prevent excessive false positives and negative reporting, IDSs used in embodiments of the invention are configured for the particular implementation environment. For example, where an IDSs is used to protect a control network with control devices based on the Windows operating system, the IDSs are disable from reporting attacks that would only affect UNIX systems.

Embodiment of the invention also beneficially uses IDSs in conjunction with Intrusion Protection Systems (IPSs), discussed below. Whereas the former are configured to detect potentially adverse traffic and alert the operator, the latter are intended to detect such traffic and block it. The IDSs of such embodiments are configured to utilize signatures to recognize anomalies, through patterns of "suspicious activity," and to notify the operator accordingly. This can be preferred over outright blocking (as in the case of IPSs), since some anomalies may actually be legitimate traffic, the blocking of which could affect the effectiveness or safety of the process control system.

The IDSs used also, preferably, provide detailed reporting of events. Thus, utilizing reporting capabilities provided in IDS systems available in the marketplace, those used in conjunction with control networks (and hybrid business/control networks) according to the present invention, present forensics such as a packet capture of the attack—in addition to source, destination, and protocol used in an attack. IDSs used in embodiment of the invention also, preferably, correlate similar events and identify them as a single attack, rather than reporting a single attack from a hacker. This allows for alarm consolidation which results in fewer pages or notifications being sent out.

Inline Intrusion Protection

The IDSs of the illustrated embodiment not only detect threats, but mitigate them by blocking adverse traffic carrying them. Such IDSs, commonly referred to as Intrusion Protection Systems (IPSs), are commercially available in the marketplace and are used in the illustrated embodiment, along with and/or instead IDSs.

Use of IPSs 68, 70 in the illustrated embodiment is preferred, e.g., over firewalls themselves. For example, a firewall can be configured to allow telnet for remote access to a control system. It will log all the connections related to telnet, but it can't determine what someone—an intruder or otherwise—is doing within that connection. A hacker could be using telnet to gain access to the system and the firewall wouldn't think twice about allowing it. Use of an IPS at the interface of a control network and/or on a business network that interfaces with a control network permits not only detection of attempts to hack into the network (e.g., the hacker's use of multiple passwords), but also blocks those attempts by shutting down the telnet connection.

IPSs 68, 70 provide real-time blocking of traffic that can harm a control network. There are many types of attacks that can bring down a system with a single packet. Simply detecting such packets and alerting the operator may not be sufficient. Recent attacks of this nature include the SQL Slammer and MyDoom attacks affecting Microsoft Windows products. To prevent the IPSs from blocking legitimate traffic on the control network, they are preferably configured to block attacks that are well-defined and not anomaly based.

IPSs 68, 70 are employed in-line, meaning that affected network traffic must traverse the IPSs, e.g., before getting to—or through—the control portion 18 of a site network 16. To avoid loss of connectivity in the event of IPS failure, IPSs employed in the illustrated embodiment preferably provide "fail open" or "fail closed" modes of failure-mode operation. These determine whether or not traffic will pass the IPS in the event of fault. Typically, the IPSs employed in the illustrated embodiment are configured for "fail close," thereby blocking or locking down a protected control network in the event of IPS failure.

In those embodiments where this is not preferred or desirable (e.g., because it would prevent the control devices on the control network from receiving set points or other safety-critical information from the business network to which the control network is connected), a "fail open" mode can be selected. Preferably, however, in cases where the control system is responding to setpoints or other critical information from the business network, a high availability IPS is utilized to ensure that secure connectivity continues even in the event of a point failure.

Host-Based Intrusion Protection

In addition to intrusion detection and/or in-line intrusion protection devices—which monitor the control network and/or business network to which it is attached for attacks and which are independent from the control system itself—the illustrated embodiment utilizes host-based intrusion protection on one or more of the digital data processors (e.g., workstation 28, PC 30, and so forth) that make up the control network 18. Such protection can also be used on the digital data processors (e.g., workstation 38, servers 40, 48, PC 44, mainframe 46, and so forth) of the business (or other) network to which the control network is attached. Host IPS offers a "last resort" protection for the devices within these zone. If a hacker is able to compromise the respective firewalls 54, 56, 58 and the network-based IPS 68, 70 have failed or has been compromised, host-based IPS still offer protection. In the illustrated embodiment, this works by making a baseline of the operating system and applications on each device and blocking any traffic coming from the network 10 that could potentially interrupt the recorded "norm."

Requirements Summary

Both business networks and control networks impose the same basic requirements for intrusion detection and prevention: to prevent unwanted or malicious traffic. However the impacts of an intrusion in each environment are very different. On a business network, an intrusion may result in the loss of data, or interruption of the ability to transact business. Control networks, on the other hand, carry real time data which often operates mission critical processes. Intrusions on the control network may have effects ranging from loss of production to safety issues resulting in injury. Depending on the severity of the event, environmental damage may occur or loss of life resulting in legal action.

To protect the control network (zone 18) against the complete spectrum of threats and vulnerabilities, IPS 68, 70 (and IDSs that may be used in embodiments of the invention) meet the following requirements: intrusion detection accuracy; prevention is required—not just detection; must cover a broad range of attacks; analyze all relevant traffic; utilize highly granular detection and response; flexible policy management; scalable threat management; sophisticated forensics and reporting; maximum sensor uptime; wire speed performance.

IPS Implementation

Host-Based IPS

As mentioned above, host-based IPS provides an added level of protection on the operating system side of the network 10. The host-based IPS is normally installed as an application that starts with the operating system of each applicable device. As with network IPS (discussed below), host-based IPS utilize signature or anomaly-based detection. In preferred embodiments, anomaly-based detection is employed on hosts in order to avoiding consuming their processing resources listening to and identifying all network traffic. Moreover, since the host system knows what is permissible and what is not, it is easier to shut down anomalies.

Network-based IDS/IPS Placement Options

The text that follows outlines physical options for placement of an IDS/IPS between the business network and control network and, more specifically, between plant network zone 16 and controls network zone 18.

Figure 4:
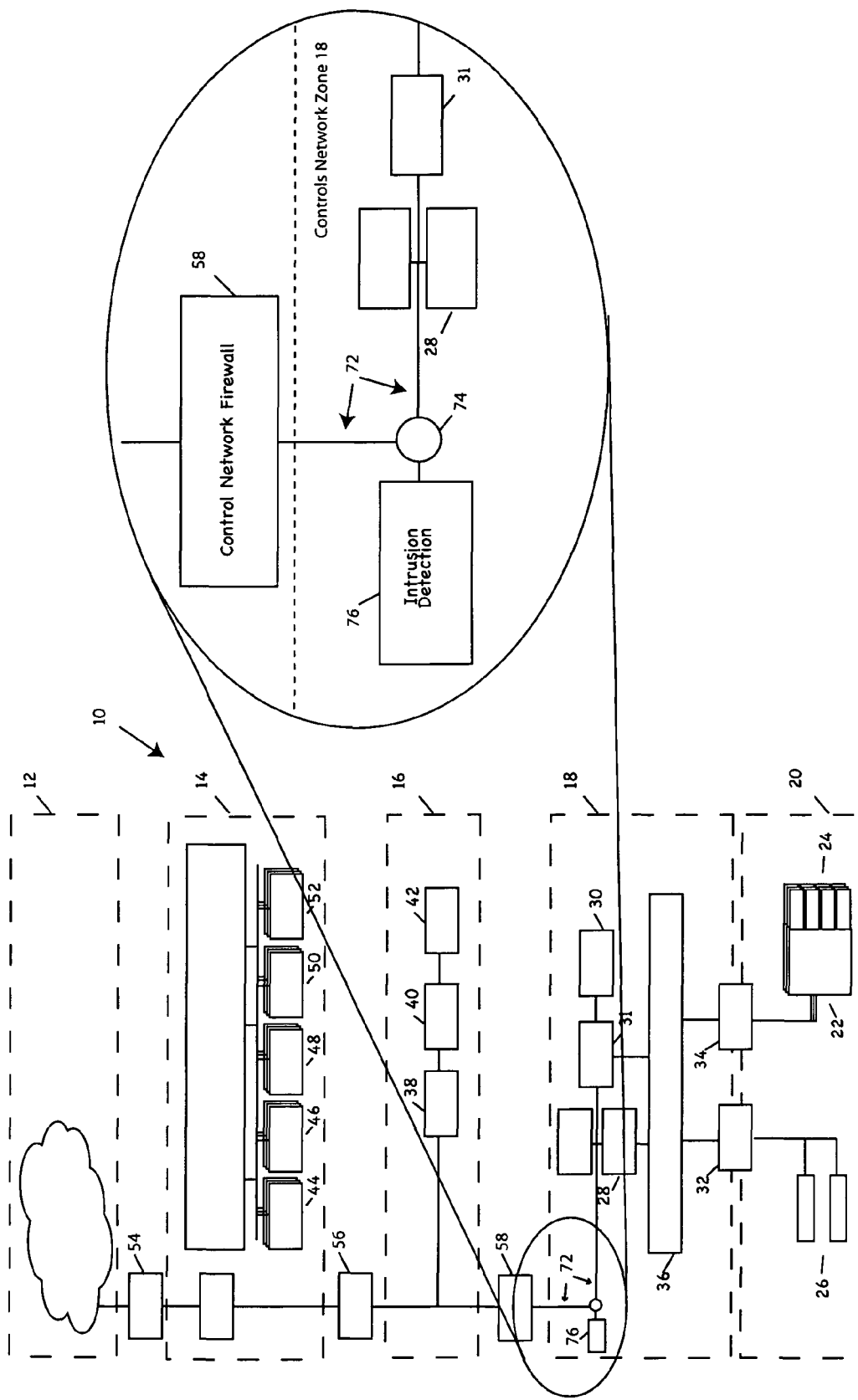
FIG. 4 depicts a "tap" mode configuration for an intrusion detection device in a network according to the invention.

Referring to FIG. 4, the "tap mode" is illustrated. This mode allows monitoring of existing network traffic between plant network zone 16 and controls network zone 18 on a physical link in the network, here, labelled 72, without interrupting it. This mode provides intrusion detection (not prevention) by IPS 70—here, labelled 76 to signify that differing role and/or to signify the use of alternate equipment.

Figure 5:
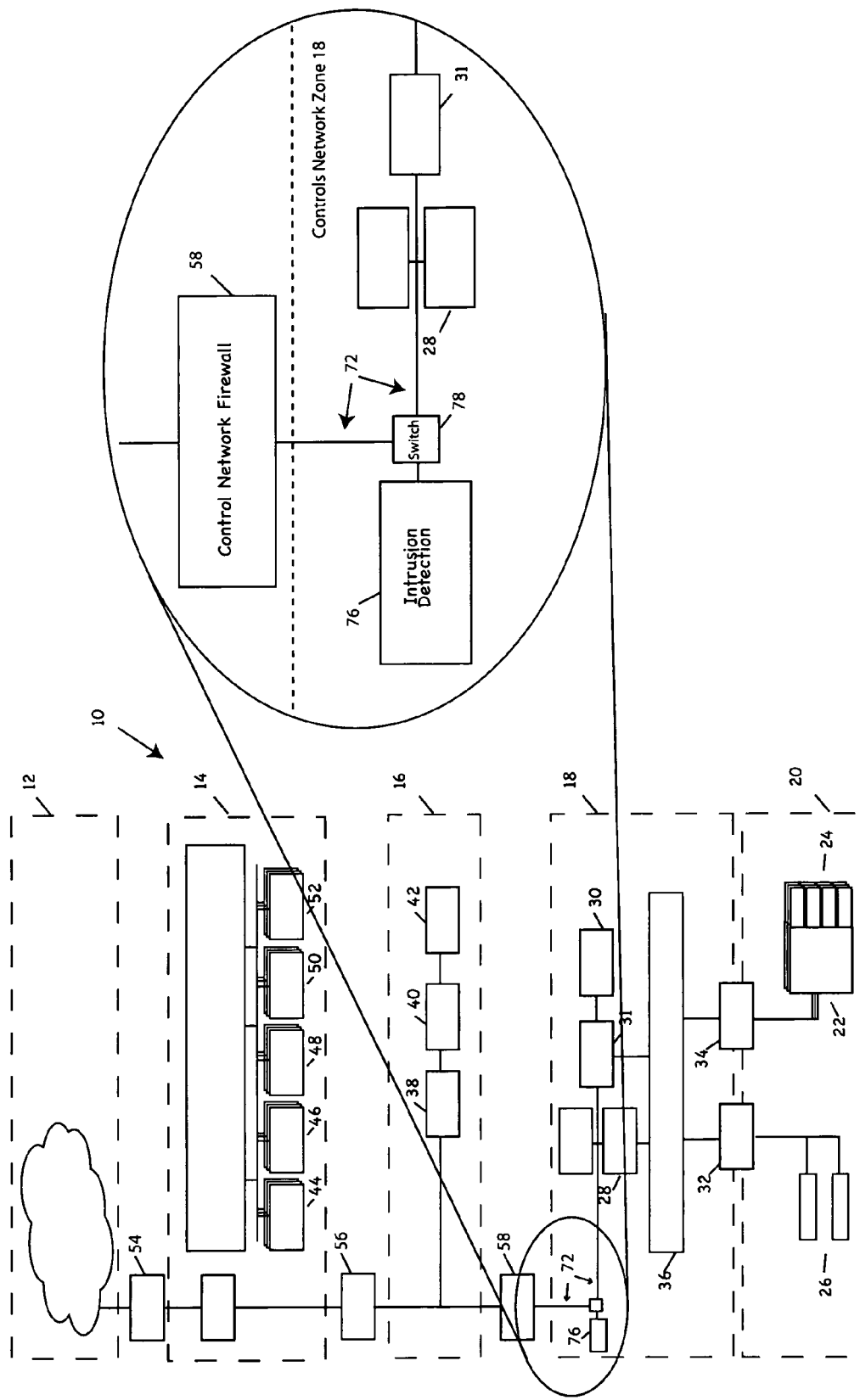
FIG. 5 depicts a "mirror" mode configuration for an intrusion detection device in a network according to the invention.

Referring to FIG. 5, "mirror mode" port mirroring is illustrated. Like tap mode, this does not allow for prevention, only detection—here, again, by IDS 76 (which, again, may comprise IPS 70 taking a differing role and/or the use of alternate equipment). It requires that a switching device 78 interconnecting the network to the IDS 76 allow for mirror or spanning or, alternatively, use a hub (not shown) as opposed to a switch.

Inline mode is illustrated in FIG. 1. This places the IPS 70 on the physical link 72 in between the business network and the control network being protected. This is similar in design to tap mode. However in this implementation, all traffic physically must pass through the IPS 70. This allows the IPS to shutdown any offending network connections and, hence, to serve as an IPS. It will be appreciated that even in this mode, the IPS 70 can be configured to serve as an IDS for some network occurrences (e.g., where a signature or combination signatures do not obviously signify an attack), yet, as an IPS for other network occurrences.

Preferred embodiments of the invention utilize this inline mode, with signatures as described below for optimal protection. The IPS 70 is "tuned" by removing protocols not required for network operation, removing signatures for operating systems and applications not in use, and to insure that the IPS permits (permitted) traffic to pass at a rate that meets bandwidth requirements.

In a given embodiment of the invention, the decision of whether to use IDSs (e.g., in configurations shown in FIGS. 4 and 5) or an IPS (e.g., in the configuration shown in FIG. 1) depends on a number of factors, e.g., whether IDS alerts (as opposed to IPS blocking) contain enough information to suit site policy requirements; whether alerts be delivered via an e-mail or paging system (or otherwise delivered quickly enough to be acted upon by site personnel); whether alerts be generated on a path other than the network connection supporting the IPS (back door access); whether the IPS perform an action such as modify a firewall policy or send SNMP traps.

When used, IPS 70 is selected in accord with its network bandwidth capability, as well as number of physical connections; speed of the physical connections needed (throughput); speed of the combined physical connections (aggregate throughput); and special IP network constraints such as VLAN use. Moreover, the following steps are followed in order to facilitate proper implementation:

Vulnerability assessments: The IPS 70 is periodically tested for any known vulnerabilities to ensure that its operation is uninterrupted. A close relationship with the IPS manufacturer insures identifying known vulnerabilities and remedying them quickly.

Periodic audits of security policy: Security is treated as an on-going process, dictating that the security policy is updated to contain new protocols, applications, and user access levels.

Change control: A rigid set of change controls on the IPS 70 are maintained. The configuration is documented, as are any changes.

Testing signatures: Generic IPS signatures are tested before prevention/blocking is enabled. Testing of custom signatures is also done to ensure that alerts are generated when required.

Updating signatures: As the IPS manufacturer updates signatures for new attacks, they are collected and tested. Once determined to apply, those signatures are installed in IPS 70.

Analyzing alerts/responses: Alerts sent by the IPS (or IDS) are analyzed by skilled personnel who can identify hacking attempts. This includes analyzing alerts sent by the IPS, collecting the forensics, and delivering them to proper authorities.

System monitoring: The IPS 70 permits a remote system to monitor the health of the device and to notify site personnel, e.g., by e-mail or pager, in the event of apparent fault.

Signature Definition

IPS 70 and, where used, IDS 76 utilize signatures to detect potential intrusions in the network (e.g., zone 18). Commercially available IPS and IDS devices are normally supplied with signatures for detecting anomalies on a typical business network. IPS 70 and IDS 76 use, in addition to those "generic" signatures, specific signatures that enable them to detect anomalies or unusual traffic on the control network, e.g., in zone 18.

As those skilled in the art will appreciate, a signature is a set of checks (for example, string matches, IP port comparisons, patterns of packets or subpackets, and so forth) that are applied to network traffic seen by the IDS/IPS. Signature-based detection relies on comparison of traffic to a database containing signatures of known attacks. The IPS 70 use signatures to identify "attacks"—that is, combinations or aggregations of signatures and, where appropriate, supporting/corroborating data regarding a given network event—in order to determine whether the event represents an intrusion. By validating the occurrence of several signatures in a typical attack, false positive detections are minimized. Of course, where intrusion is evident from a single signature, the IPS 70 can rely on that single signature, as well, to determine that attack has (or is) occurring.

IDS 76 can similarly rely on combinations or aggregations of signatures (and supporting data) in identifying attacks and, therefore, avoiding false positives. However, since the IDS is responsible for reporting, not blocking, potential intrusions, the adverse consequences of false positives is typically lower. Hence, depending upon implementation, IDS 76 can be configured to signal attacks "more liberally" than an IPS, i.e., based on occurrence of fewer signatures (and less corroborating data, if any) associated with a given event.

As noted above, the IPS 70 can be configured to serve as an IDS for some network occurrences, e.g., where a signature or combination signatures do not obviously signify an attack), and an IPS for others. In this regard, the discussions above concerning both IDSs and IPSs is germane.

Signatures

The IPS/IDS devices used in illustrated embodiment include, for example, 1700 attack definitions focused on business network-specific services. These are made up by some 2400 signatures. The following table lists examples of these signatures.

| Protocol or Service | Signature Description |
| --- | --- |
| TFTP | W32/Blaster Worm |
| TFTP | Nimda Worm Attack |
| DNS | NXT Buffer Overflow |
| RPC | AUTOFS Remote Command Execution |
| RADIUS | User Name Too Long |
| RADIUS | User Password Too Long |
| FINGER | Bomb Attack |
| FTP | CWD ~root |
| FTP | FTPD x86 Linux Buffer Overflow |

Significantly, as noted above, IPS 70 and IDS 76 use, in addition to generic signatures, specific signatures that enable them to detect anomalies or unusual traffic on the control network. The following table lists these "custom" signatures. While these were developed for use in connection with I/A Series process control systems (available from the assignee hereof, Foxboro/Invensys plc), it will be appreciated that they, or the like, are applicable to systems, from other sources.

| Protocol or Service | Signature Description |
| --- | --- |
| TELNET | Root Login with Wrong Password |
| TELNET | Attempt to Login with IA Standard Username |
| TELNET | Attempt to Login with IA Standard Password |
| FTP | Attempt to Login with IA Standard Username |
| FTP | Attempt to Login with IA Standard Password |
| REXEC | Account Login Attempt |
| MAC | Traffic originating from unknown MAC addresses |
| IP | Traffic originating from unknown IP addresses |
| IA DATA | Attempt to change specific IA setpoints out of range |

Still additional custom signatures are provided in the table below. As above, there were developed for use in connection with the I/A Series process control systems, but they, or the like, are applicable to systems, from other sources.

| Service or Protocol | Signature Characteristic | Reason |
| --- | --- | --- |
| TELNET | Any login with the password gnomes | No outside the plant access to second enet |
| TELNET | Attempted login Administrator password password | PC based (AW70) must use password (lower case) |
| TELNET | Attempted login fox password gnomes | PC based must use password of gnomes |
| TELNET | Attempted login account hstorian | hstorian (correct spelling) is a user that must exist |
| TELNET | Attempted login account bpm | |
| TELNET | Attempted login account pam | |
| TELNET | Root Login with Wrong Password | |
| TELNET | Attempt to Login with IA | |

-continued

| Service or Protocol | Signature Characteristic | Reason |
|---|---|---|
| TELNET | Standard Username Attempt to Login with IA Standard Password | |
| FTP | Attempt to Login with IA Standard Username | |
| FTP | Attempt to Login with IA Standard Password | |
| FTP | file name sam | PC password location |
| TFTP | file name sam | PC password location (Variation of Bud's suggestion) |
| FTP | file name passwd | password files in Unix |
| TFTP | file name passwd | password files in Unix (Variation of Bud's suggestion) |
| FTP | file name dmpasswd_cfg | password files in display manager |
| TFTP | file name dmpasswd_cfg | password files in display manager (Variation of Bud's suggestion) |
| IP | Traffic originating from unknown IP addresses | |
| MAC | Traffic originating from unknown MAC addresses | |
| MAC | Allow only 6ccxxxxxx | The IA system "owns" the 6cc block of macs for fault tolerant stations |
| REXEC | Account Login Attempt | |
| Data payload | Packet payload contains "setpars" | These functions allow setting of control variables |
| Data payload | Packet payload contains "omset" | These functions allow setting of control variables |
| Data payload | Attempt to change specific IA set-points out of range | |

It will be appreciated that additional signatures (control network-specific, or otherwise) can be used, in addition to or instead of those listed above. In this regard, the following verification exercises are suggested for any proposed additional control network-specific signatures:

Use traffic generation tools or packet dumps to verify that the Signature(s) match the traffic it is intended to detect.

Verify that the Signature is not duplicating functionality already provided by the IDS/IPS sensor and examine whether the test traffic raises the standard delivered alerts in addition to the User-Defined Signature alerts.

Deploy the Signature to a non-production IDS/IPS sensor connected to either a test network that duplicates the production network traffic or a non-production IDS/IPS sensor connected to the production network in Span or Tap mode (see FIGS. 4 and 5).

New signatures may range from checking the value of a header field to highly complex checks of different information in a specific order. It is suggested that the following information be available to aid in creating an further signatures: reason for creating this Signature; technical information references for this Signature (see below); protocol in which the traffic the Signature will search for occurrences (also known as the impact protocol); specific hardware or software platforms affected by this traffic; severity of this event; the direction in which the traffic to be watched for occurs; specific criteria that comprise the Signature, such as field values and patterns to match; action to be taken when the Signature is detected; a method, data, or tool to be used for testing the Signature.

As further signatures may be based on an advisory or some other description of a known vulnerability, it is advisable to have available whatever information can be found regarding the attack (or other condition) the Signature will be used to detect. This can include traffic dumps of an attack in progress or the exploit code itself. This information is used to determine the characteristics of the vulnerability. The information will likely include specific criteria that comprise the Signature, such as field values and patterns to match. Research may lead to a long list of characteristics specific to the exploit traffic. It should be borne in mind, however, that Signature based on all suspicious characteristics may be too specific and, hence, may be inefficient or lead to detection problems; whereas a Signature based on only one of the characteristics may be too broad and generate false positives.

Implementation

In embodiments of network 10 for application in process control environments and, more generally, in connection with manufacturing, environmental control, industrial or other operation in which control systems are employed, the following guidelines preferably govern implementation details:

Hardening

In addition to the procedures discussed above, digital data processing devices (e.g., PCs, workstations, mainframes, and so forth) employed within the controls network zone 18, as well as the plant network zone 16 and/or other illustrated zones, are hardened by deactivation of all unnecessary services. This can be accomplished by an iterative process of 1) selectively deactivating an operating system and other services (e.g., ftp, etc.) that is or may not be necessary for normal and/or expected operation;
2) executing a backup (e.g., preferably an incremental backup) to preserve current system status;
3) testing system and/or application execution to determine whether it achieves normal and/or expected operation;
4) if testing reveals that a given deactivation results in unexpected system or application) operation, re-activating the service and repeating steps (1)-(4) with other services;
(5) Once all services that revealed non-essential to normal and/or expected operation are deactivated in accord with steps (1)-(4), the digital data processing device under consideration (and/or the network 10 as a whole) is tested for penetration, e.g., in the manner of a hack, intrusion and/or other mischievous action. If penetration is occurs, steps (1)-(5) are repeated to find additional services for deactivation.

Variations on this methodology include, for example, deactivating and testing groups of services at a time (though, this can lead to confusion as to which services are truly necessary and which are not). Other variations include reversing steps (1) and (2), by way of non-limiting example.

Environmental Considerations

The surrounding environment is taken into account when selecting the media or "wiring method" for network 10 (which media may be "wired," wireless, or otherwise). While unshielded twisted pair is accepted as the wiring method for an office environment, a plant environment introduces conditions which will result in problems. The plant environment may introduce magnetic field interference, radio frequency interference, temperature extremes, vibration, moisture, and dust in the air. The standard RJ-45 connector used on twisted pair wiring and equipment is not water or dust tight and will result in intermittent connections as it is exposed to adverse conditions. Further studies have been done to show that the gold plating on the contacts will degrade when exposed to vibration. An industrial version of this connector is not available and selecting a different connector will not allow the use of readily available network equipment. The cable itself is vulnerable to interference and the jacket material is thin enough that if run in conduit will introduce capacitance and degrade the performance of the network.

Coaxial cable interconnect methods like ThinNet and ThickNet are not preferred for office environments due to the proliferation of unshielded twisted pairs, however are still valid wiring methods in the control environment (and, hence, within at least zones 18 and 20, if not also zones 16 and 14). The shielding of the cable provides for immunity to interference, plenum grade jacket materials are available and the connectors used provide for vibration, dust and moisture immunity.

The use of fiber-optic cable is increasing as the cost has decreased. It is immune to many of the environmental conditions found in the process control environment. The connectors used provide for vibration, dust and moisture immunity and most commercial grade network equipment providers have standard options to support fiber.

Physical Security: In practice, steps are taken to ensure that adequate security measures are taken with respect to implementation of network 10 to restrict unauthorized access to all components utilized in the Control Network (e.g., zones 18, 20), if not also illustrated upstream zones 14, 16. Network equipment is installed in locked areas to prevent tampering. Cable runs are installed in a method to minimize access. Where equipment is installed in locked cabinets, adequate ventilation and air filtration are available.

Protocols: Network 10 is implemented in compliance with one or more of the following protocols and standards: Ethernet; TCP/IP; Device Integrator (allows connectivity between foreign devices at the I/O level); FieldBus (zone 20 and in zone 18, e.g., as necessary to support communications between devices of zones 18 and 20); ProfiBus (zone 20 and in zone 18, e.g., as necessary to support communications between devices of zones 18 and 20); ModBus (zone 20 and in zone 18, e.g., as necessary to support communications between devices of zones 18 and 20); Nodebus (zone 20 and in zone 18, e.g., as necessary to support communications between devices of zones 18 and 20); OPC (Ol e for Process Control) (zone 20 and in zone 18, e.g., as necessary to support communications between devices of zones 18 and 20).

Addressing: Network 10 can utilize one or more of the following addressing methods for communications between devices: MAC Addressing; IP Addressing (in the illustrated embodiment, addressing is static and, thus, management of addresses to prevent duplicates is required, though this may not be the case in other embodiments; moreover, addressing is generated by a system definition configurator).

Data Flow Awareness: Network devices are configured to require identity information from zones, and levels; User access levels are defined, e.g., to prevent unauthorized users from accessing more secure areas of the network 10, e.g., zones 18-20.

Firewalls: All external (support) connections are handled in a DMZ; the firewalls, or other network devices, are implemented to log traffic.

Intrusion Detection And Prevention: To facilitate intrusion protection on network 10, the following steps are employed:
  Frequent backups of data are performed, with periodic restorations to insure integrity.
  Host-based protection mechanisms are employed.
  Real-time prevention decisions are implemented, e.g., by IPSs.
  Network devices are configured to protect from attacks at various phases—not just at late stages of attack.
  Network devices are configured to facilitate real time correlation at the agent and enterprise level
  Security mechanisms are implement proactively, not reactively.
  Though IDSs are used (e.g., to signal alerts when the immediacy or obviousness of threat is not readily apparent), a preference is given to IPSs (e.g., elements 68, 70 of FIG. 1) and other devices that provide prevention rather than detection—at least where possible and desirable.
  Routing security audits are performed, e.g., by network management personnel.

Wireless (WiFi) Network Connections: Where wireless access is permitted, the network 10 is implemented along the following lines:
  RF coverage area of the wireless services is surveyed, e.g., to permit placement that will not expose network to unnecessary risk.
  RF interference potentials are taken into account with wireless device placement.
  Decibel signal thresholds are enforce to insure solid connectivity
  Directional antennas are employed, e.g., to insure signal pattern that will not expose network to unnecessary risk.
  Network devices utilize only commercial grade equipment.
  Security: To improve security of wireless devices:
  Wireless devices are installed in a separate DMZ on the firewall.
  MAC address filtering is utilized to limit risk of access by unauthorized computers and other equipment.
  Strong data encryption is employed, preferably VPN encryption on the wireless segment
  In implementations where WEP is utilized, use only dynamic or rotating keys are employed.
  SSID broadcasting on the wireless access points is disabled.
  Disable/change SNMP community passwords on all access points
  SSIDs are selected for obscurity.
  Wireless segment are monitored (e.g., automatically or by network personnel) for unknown nodes
  Network performance is monitored and any anomalies immediately investigated.
  Separate, strong administration passwords are maintained on the access points
  Event or syslogging and monitoring is employed
  A central authentication server is employed.
  Where possible, network devices and other attached equipment are powered down during off hours
  Device-independent authentication is used so that lost or stolen devices can't gain access to the WLAN.

Remote Access: In implementations that permit remote access, the following guidelines are followed:
  Strong authentication is employed by modems and other remote access devices (and software).
  Modem access requires require dial back methods and encryption.
  VPN are employed to gain benefit of encryption.

Described above are systems and methods meeting the desired objects, among others. Those skilled in the art will appreciate that the embodiments shown in the drawing and discussed herein are merely examples of the invention and that other embodiments incorporating changes thereto may fall within the scope of the invention. Thus, by way of example, it will be appreciated that, in some embodiments of the invention, the devices of zones 18 and 20 may be combined into a single zone, e.g., comprising PLCs, I/O devices, and other control devices that are coupled to the actuators, sensors, and the like, e.g., that define the system being controlled, and/or form parts (or the whole of) those actuators, sensors, and the like themselves. Likewise, it will be appreciated that the devices that comprise zones 14 and 16 may be combined into a single zone, e.g., that supports business applications and that interfaces with the control network, e.g., via a firewall and IPS/IDS device (or devices), as described above. By way of further example, it will appreciated that IPS/IDS devices can be placed at the interface of each of the network zones and/or at another combination of the interfaces than that shown in FIG. 1.

In view thereof, what we claim is:

1. A digital data network for use with process control systems, computer-based manufacturing/production control systems, environmental control systems, and/or industrial control system (collectively, "control systems"), the digital data network comprising:
   A. a plurality of digital data devices,
   B. network media that is coupled to digital data devices to support communications therewith,
   C. the digital data network comprising a first zone and a second zone, each zone including one or more of the digital data devices and the network media that is coupled thereto, the first zone comprising digital data devices executing business applications, the second zone comprising devices that monitor and control a control system,
   D. the network media of the first zone being coupled for at least selected communications to a network external to the digital data network by a first firewall and any of a first intrusion protection system (IPS) and a first intrusion detection system (IDS), and
   E. the network media of the second zone being coupled for selected communications to the first zone by a second firewall and any of a second intrusion protection system (IPS) and a second intrusion detection system (IDS),
   F. wherein any of the first IPS and first IDS implements security protocols tailored to connectivity requirements or traffic patterns of the first zone, and any of the second IPS and second IDS implements security protocols tailored to connectivity requirements or traffic patterns of the second zone, at least one of said security protocols implemented in the first or second zones utilizing signature-based detection, where signature-based detection utilized in the first zone, if any, comprises signatures specific to business networks and signature-based detection utilized in the second zone, if any, comprises signatures specific to control networks.

2. The digital data network of claim 1, wherein one or more of the digital data devices of the second zone comprise control devices.

3. The digital data network of claim 2, wherein one or more of the control devices being any of (i) coupled to any of actuators and sensors for the control system and (ii) comprising any of actuators and sensors for the control system.

4. The digital data network of claim 3, wherein the network external to the digital data network comprises a public network 5. The digital data network of claim 3, wherein the network external to the digital data network comprises an Internet.

6. The digital data network of claim 5, wherein one or more digital data devices of the first zone execute any of an Internet browser and a messaging application.

7. The digital data network of claim 1, comprising a third zone including one or more control devices coupled for communication with one or more digital data devices of the second zone.

8. The digital data network of claim 7, wherein one or more of the control devices are coupled to any of actuators and sensors that make up at least a portion of the control system and/or a system controlled thereby.

9. The digital data network of claim 7, wherein the one or more control devices of the third zone that are coupled to the one or more digital data devices of the second zone via any of media and devices supporting a control network protocol.

10. The digital data network of claim 9, wherein the control network protocol comprises any of a FieldBus protocol, a ProfiBus protocol, a ModBus protocol, a Nodebus protocol, and an OPC protocol.

11. The digital data network of claim 9, comprising any of a control station and a interface providing communications coupling between one or more control devices of the third zone and one or more digital data devices of the second zone.

12. The digital data network of claim 10, wherein the network media of the first and second zones include any of local area networks and wide area networks.

13. The method of claim 1, wherein the security protocol implemented in the first zone utilizes signature-based detection with signatures specific to business networks and the security protocol implemented in the second zone utilizes signature-based detection with signatures specific to control networks.

14. A digital data network for use with process control systems, computer-based manufacturing/production control systems, environmental control systems, and/or industrial control system (collectively, "control systems"), the digital data network comprising:
   A. a first network zone comprising one or more digital data processors that are coupled for communications via network media and that execute applications to provide any of a monitoring and control interface to control devices of the control system,
   B. a second network zone comprising one or more digital data processors that are coupled for communication via network media and that execute any of business, engineering and scientific applications and functions (collectively, "business applications") connected with a manufacturing, environmental control, industrial or other operation in which control systems are employed,
   C. a third network zone comprising one or more digital data processors that are coupled for communication via network media and that execute business applications,
   D. the network media of the third network zone being coupled to a public network by a first firewall and any of a first intrusion protection system (IPS) and a first intrusion detection system (IDS),
   E. the network media of the second network zone being coupled to the network media of the third network zone by a second firewall,
   F. the network media of the first network zone being coupled to the network media of the second network zone by a firewall and any of a second intrusion protection system (IPS) and a second intrusion detection system (IDS),
   G. wherein any of the first IPS and first IDS implements security protocols tailored to connectivity requirements or traffic patterns of the third zone, and any of the second IPS and second IDS implements security protocols tailored to connectivity requirements or traffic patterns of the first zone, at least one of said security protocols implemented in the first or third zones utilizing signature-based detection, where signature-based detection utilized in the first zone, if any, comprises signatures specific to control networks and signature-based detection utilized in the third zone, if any, comprises signatures specific to business networks.

15. The digital data network of claim 14, further comprising a field I/O network zone comprising one or more of said control devices, the control devices being any of (i) coupled to any of actuators and sensors for the control system and (ii) comprising any of actuators and sensors for the control system.

16. The digital data network of claim 15, wherein one or more control devices of the field I/O network zone are coupled to the one or more digital data processors of the first network zone via any of media and devices supporting a control network protocol.

17. The digital data network of claim 16, wherein the control network protocol comprises any of a FieldBus protocol, a ProfiBus protocol, a ModBus protocol, a Nodebus protocol, and an OPC protocol.

18. The digital data network of claim 17, comprising any of a control station and a interface providing communications coupling between one or more control devices of the field I/O zone and one or more digital data devices of the first network zone.

19. The digital data network of claim 14, wherein the network media of each of the first business network zone and the second business network zone comprise any of a local area network (LAN) and a wide area network (WAN).

20. The method of claim 14, wherein the security protocol implemented in the first zone utilizes signature-based detection with signatures specific to control networks and the security protocol implemented in the third zone utilizes signature-based detection with signatures specific to business networks.

21. A method of operating a digital data network for use with process control systems, computer-based manufacturing/production control systems, environmental control systems, and/or industrial control system (collectively, "control systems"), the method comprising:
   A. executing business applications on or more digital data processors that are interconnected in a first zone on the network,
   B. controlling the control system with one or more digital data processors that are interconnected in a second zone on the network,
   C. filtering with a first firewall digital data traffic between a network external to the digital data network and the first zone,
   D. filtering with a second firewall digital data traffic between the first zone and the second zone, and
   E. monitoring with any of a first intrusion detection system (IDS) and a first intrusion protection system (IPS) digital data traffic traveling between the first zone and the external network,
   F. monitoring with any of a second intrusion detection system (IDS) and a second intrusion protection system (IPS) digital data traffic traveling between the first zone and the second zone. ,
   G. implementing, with any of the first IPS and first IDS, security protocols tailored to connectivity requirements or traffic patterns of the first zone,
   H. implementing, with any of the second IPS and second IDS, security protocols tailored to connectivity requirements or traffic patterns of the second zone,
   I. wherein at least one of said security protocols implemented in the first or second zones utilizes signature-based detection, where signature-based detection utilized in the first zone, if any, comprises signatures specific to business networks and signature-based detection utilized in the second zone, if any, comprises signatures specific to control networks.

22. The method of claim 21, comprising signaling an alert when traffic monitored in step (E) is indicative of an intrusion.

23. The method of claim 21, comprising blocking traffic identified in step (E) as an intrusion.

24. The method of claim 21, wherein one or more of the digital data devices of the second zone comprise control devices.

25. The method of claim 21, wherein one or more of the control devices being any of (i) coupled to any of actuators and sensors for the control system and (ii) comprising any of actuators and sensors for the control system.

26. The method of claim 21, comprising executing any of an Internet browser and a messaging application with a digital data device in the first zone.

27. The method of claim 21, communicating between one or more of the digital data devices in the second zone and one or more control devices in a third zone of the network.

28. The method of claim 27, wherein one or more of the control devices are coupled to any of actuators and sensors that comprise and/or form at least a part of a system being controlled.

29. The method of claim 27, comprising communicating between the one or more control devices of the third zone and the one or more digital data devices of the second zone via any of media and devices supporting a control network protocol.

30. The method of claim 29, wherein the control network protocol comprises any of a FieldBus protocol, a ProfiBus protocol, a ModBus protocol, a Nodebus protocol, and an OPC protocol.

31. The method of claim 21, wherein implementing the security protocol in the first zone comprises utilizing signature-based detection with signatures specific to business networks and implementing the security protocol in the second zone comprises utilizing signature-based detection with signatures specific to control networks.

* * * * *